US010721596B1

(12) United States Patent
Beg et al.

(10) Patent No.: US 10,721,596 B1
(45) Date of Patent: Jul. 21, 2020

(54) CONTROLLING WIRELESS CONNECTIONS IN WIRELESS SENSING SYSTEMS

(71) Applicant: Cognitive Systems Corp., Waterloo (CA)

(72) Inventors: Christopher Beg, Kitchener (CA); Tajinder Manku, Waterloo (CA); Mohammad Omer, Waterloo (CA)

(73) Assignee: Cognitive Systems Corp., Waterloo (CA)

(*) Notice: Subject to any disclaimer, the term of this patent is extended or adjusted under 35 U.S.C. 154(b) by 0 days.

(21) Appl. No.: 16/856,529

(22) Filed: Apr. 23, 2020

Related U.S. Application Data

(60) Provisional application No. 62/840,668, filed on Apr. 30, 2019.

(51) Int. Cl.
*H04W 24/00* (2009.01)
*H04W 4/029* (2018.01)
(Continued)

(52) U.S. Cl.
CPC ........... *H04W 4/029* (2018.02); *H04W 4/025* (2013.01); *H04W 4/33* (2018.02); *H04W 4/38* (2018.02)

(58) Field of Classification Search
None
See application file for complete search history.

(56) References Cited

U.S. PATENT DOCUMENTS 4,054,879 A 10/1977 Wright et al.
4,636,774 A 1/1987 Galvin et al.
(Continued)

FOREIGN PATENT DOCUMENTS

CA 2834522 5/2014
CA 2945702 8/2015
(Continued)

OTHER PUBLICATIONS

Dekker, et al., "Gesture Recognition with a Low Power FMCW Radar and a Deep Convolutional Neural Network", Proceedings of the 14th European Radar Conference, Nuremberg, Germany, Oct. 11-13, 2017, 4 pgs.

(Continued)

*Primary Examiner* — Suhail Khan
(74) *Attorney, Agent, or Firm* — Henry Patent Law Firm PLLC

(57) ABSTRACT

In a general aspect, motion is detected using wireless signals. In an example, a method includes receiving first motion detection output data representing a degree of motion detected by a wireless sensing system based on wireless signals exchanged in a wireless communication network. The wireless communication network includes a first access point device and a first client device communicatively coupled by a first wireless communication link. The method also includes receiving network information indicative of a network topology of the wireless communication network, and generating a first control signal configured to change a characteristic of the first wireless communication link based on the first motion detection output data and network information. The method further includes receiving second motion detection output data representing a degree of motion detected by the wireless sensing system after the characteristic of the first wireless communication link has changed in response to the first control signal.

30 Claims, 20 Drawing Sheets

(51) Int. Cl.
   *H04W 4/02*   (2018.01)
   *H04W 4/33*   (2018.01)
   *H04W 4/38*   (2018.01)

(56) References Cited

U.S. PATENT DOCUMENTS

| | | |
|---|---|---|
| 4,649,388 A | 3/1987 | Atlas |
| 4,740,045 A | 4/1988 | Goodson et al. |
| 5,270,720 A | 12/1993 | Stove |
| 5,613,039 A | 3/1997 | Wang et al. |
| 5,696,514 A | 12/1997 | Nathanson et al. |
| 6,075,797 A | 6/2000 | Thomas |
| 6,380,882 B1 | 4/2002 | Hegnauer |
| 6,573,861 B1 | 6/2003 | Hommel et al. |
| 6,636,763 B1 | 10/2003 | Junker et al. |
| 6,914,854 B1 | 7/2005 | Heberley et al. |
| 7,652,617 B2 | 1/2010 | Kurtz et al. |
| 8,463,191 B2 | 6/2013 | Farajidana et al. |
| 8,660,578 B1 | 2/2014 | Yang et al. |
| 8,671,069 B2 | 3/2014 | Chang et al. |
| 8,710,984 B2 | 4/2014 | Wilson et al. |
| 8,812,654 B2 | 8/2014 | Gelvin et al. |
| 8,832,244 B2 | 9/2014 | Gelvin et al. |
| 8,836,344 B2 | 9/2014 | Habib et al. |
| 8,836,503 B2 | 9/2014 | Gelvin et al. |
| 9,019,148 B1 | 4/2015 | Bikhazi et al. |
| 9,030,321 B2 | 5/2015 | Breed |
| 9,253,592 B1 | 2/2016 | Moscovich et al. |
| 9,329,701 B2 | 5/2016 | Lautner |
| 9,523,760 B1 | 12/2016 | Kravets et al. |
| 9,524,628 B1 | 12/2016 | Omer et al. |
| 9,551,784 B2 | 1/2017 | Katuri et al. |
| 9,584,974 B1 | 2/2017 | Omer et al. |
| 9,609,468 B1 | 3/2017 | Moscovich et al. |
| 9,628,365 B2 | 4/2017 | Gelvin et al. |
| 9,692,459 B2 | 6/2017 | Maltsev et al. |
| 9,743,294 B1 | 8/2017 | Omer et al. |
| 9,866,308 B1 | 1/2018 | Bultan et al. |
| 9,869,759 B2 | 1/2018 | Furuskog et al. |
| 9,927,519 B1 | 3/2018 | Omer et al. |
| 9,933,517 B1 | 4/2018 | Olekas et al. |
| 9,946,351 B2 | 4/2018 | Sakaguchi et al. |
| 9,989,622 B1 | 6/2018 | Griesdorf et al. |
| 10,004,076 B1 | 6/2018 | Griesdorf et al. |
| 10,048,350 B1 | 8/2018 | Piao et al. |
| 10,051,414 B1 | 8/2018 | Omer et al. |
| 10,077,204 B2 | 9/2018 | Maschmeyer et al. |
| 10,108,903 B1 | 10/2018 | Piao et al. |
| 10,109,167 B1 | 10/2018 | Olekas et al. |
| 10,109,168 B1 | 10/2018 | Devison et al. |
| 10,111,228 B2 | 10/2018 | Griesdorf et al. |
| 10,129,853 B2 | 11/2018 | Manku et al. |
| 2002/0080014 A1 | 6/2002 | McCarthy et al. |
| 2003/0108119 A1 | 6/2003 | Mohebbi et al. |
| 2005/0128067 A1 | 6/2005 | Zakrewski |
| 2006/0152404 A1 | 7/2006 | Fullerton et al. |
| 2006/0217132 A1 | 9/2006 | Drummond-Murray et al. |
| 2006/0284757 A1 | 12/2006 | Zemany |
| 2007/0296571 A1 | 12/2007 | Kolen |
| 2008/0057978 A1 | 3/2008 | Karaoguz et al. |
| 2008/0119130 A1 | 5/2008 | Sinha |
| 2008/0240008 A1 | 10/2008 | Backes et al. |
| 2008/0258907 A1 | 10/2008 | Kalpaxis |
| 2008/0300055 A1 | 12/2008 | Lutnick et al. |
| 2008/0303655 A1 | 12/2008 | Johnson |
| 2009/0062696 A1 | 3/2009 | Nathan et al. |
| 2009/0180444 A1 | 7/2009 | McManus et al. |
| 2010/0073686 A1 | 3/2010 | Medeiros et al. |
| 2010/0127853 A1 | 5/2010 | Hanson et al. |
| 2010/0130229 A1 | 5/2010 | Sridhara et al. |
| 2010/0207804 A1 | 8/2010 | Hayward et al. |
| 2010/0306320 A1 | 12/2010 | Leppanen et al. |
| 2010/0315284 A1 | 12/2010 | Trizna et al. |
| 2011/0019587 A1 | 1/2011 | Wang |
| 2011/0035491 A1 | 2/2011 | Gelvin et al. |
| 2011/0090081 A1 | 4/2011 | Khorashadi et al. |
| 2011/0263946 A1 | 10/2011 | El Kaliouby et al. |
| 2012/0115512 A1 | 5/2012 | Grainger et al. |
| 2012/0146788 A1 | 6/2012 | Wilson et al. |
| 2012/0182429 A1 | 7/2012 | Forutanpour et al. |
| 2012/0184296 A1 | 7/2012 | Milosiu |
| 2012/0283896 A1 | 11/2012 | Persaud |
| 2013/0017836 A1 | 1/2013 | Chang et al. |
| 2013/0090151 A1 | 4/2013 | Ngai et al. |
| 2013/0094538 A1 | 4/2013 | Wang |
| 2013/0113647 A1 | 5/2013 | Sentelle et al. |
| 2013/0162459 A1 | 6/2013 | Aharony et al. |
| 2013/0178231 A1 | 7/2013 | Morgan |
| 2013/0283256 A1 | 10/2013 | Proud |
| 2014/0126323 A1 | 5/2014 | Li et al. |
| 2014/0135042 A1 | 5/2014 | Buchheim et al. |
| 2014/0148195 A1 | 5/2014 | Bassan-Eskenazi et al. |
| 2014/0247179 A1 | 9/2014 | Furuskog |
| 2014/0266669 A1 | 9/2014 | Fadell et al. |
| 2014/0274218 A1 | 9/2014 | Kadiwala et al. |
| 2014/0286380 A1 | 9/2014 | Prager et al. |
| 2014/0329540 A1 | 11/2014 | Duggan et al. |
| 2014/0355713 A1 | 12/2014 | Bao et al. |
| 2014/0361920 A1 | 12/2014 | Katuri et al. |
| 2015/0043377 A1 | 2/2015 | Cholas et al. |
| 2015/0049701 A1 | 2/2015 | Tian et al. |
| 2015/0063323 A1 | 3/2015 | Sadek et al. |
| 2015/0078295 A1 | 3/2015 | Mandyam et al. |
| 2015/0098377 A1 | 4/2015 | Amini et al. |
| 2015/0159100 A1 | 6/2015 | Shi et al. |
| 2015/0181388 A1 | 6/2015 | Smith |
| 2015/0195100 A1 | 7/2015 | Imes et al. |
| 2015/0212205 A1 | 7/2015 | Shpater |
| 2015/0245164 A1 | 8/2015 | Merrill |
| 2015/0269825 A1 | 9/2015 | Tran |
| 2015/0288745 A1 | 10/2015 | Moghaddam et al. |
| 2015/0304886 A1 | 10/2015 | Liu et al. |
| 2015/0309166 A1 | 10/2015 | Sentelle et al. |
| 2015/0312877 A1 | 10/2015 | Bhanage |
| 2015/0338507 A1 | 11/2015 | Oh et al. |
| 2015/0350849 A1 | 12/2015 | Huang et al. |
| 2015/0366542 A1 | 12/2015 | Brown et al. |
| 2016/0018508 A1 | 1/2016 | Chen et al. |
| 2016/0088438 A1 | 3/2016 | O'Keeffe |
| 2016/0088631 A1 | 3/2016 | Hedayat et al. |
| 2016/0135205 A1 | 5/2016 | Barbu et al. |
| 2016/0150418 A1 | 5/2016 | Kang et al. |
| 2016/0183059 A1 | 6/2016 | Nagy et al. |
| 2016/0187475 A1 | 6/2016 | Horng et al. |
| 2016/0203689 A1 | 7/2016 | Hintz et al. |
| 2016/0210838 A1 | 7/2016 | Yan et al. |
| 2016/0217683 A1 | 7/2016 | Li |
| 2016/0262355 A1 | 9/2016 | Swan |
| 2016/0363663 A1 | 12/2016 | Mindell et al. |
| 2017/0042488 A1 | 2/2017 | Muhsin |
| 2017/0052247 A1 | 2/2017 | Kong et al. |
| 2017/0055126 A1 | 2/2017 | O'Keeffe |
| 2017/0055131 A1 | 2/2017 | Kong et al. |
| 2017/0059190 A1 | 3/2017 | Stefanski et al. |
| 2017/0086281 A1 | 3/2017 | Avrahamy |
| 2017/0090026 A1 | 3/2017 | Joshi et al. |
| 2017/0111852 A1 | 4/2017 | Selen et al. |
| 2017/0123528 A1 | 5/2017 | Hu et al. |
| 2017/0126488 A1 | 5/2017 | Cordeiro et al. |
| 2017/0146656 A1 | 5/2017 | Belsley et al. |
| 2017/0150255 A1 | 5/2017 | Wang et al. |
| 2017/0155439 A1 | 6/2017 | Chang et al. |
| 2017/0177618 A1 | 6/2017 | Hu et al. |
| 2017/0180882 A1 | 6/2017 | Lunner et al. |
| 2017/0195893 A1 | 7/2017 | Lee et al. |
| 2017/0223628 A1 | 8/2017 | Snyder et al. |
| 2017/0251392 A1 | 8/2017 | Nabetani |
| 2017/0278374 A1 | 9/2017 | Skaaksrud |
| 2017/0280351 A1 | 9/2017 | Skaaksrud |
| 2017/0311279 A1 | 10/2017 | Allegue Martinez et al. |
| 2017/0311574 A1 | 11/2017 | Swan |
| 2017/0343658 A1 | 11/2017 | Ramirez et al. |
| 2017/0366938 A1* | 12/2017 | Wootton .......... H04B 17/318 |
| 2018/0027389 A1 | 1/2018 | Shirakata et al. |

(56) References Cited

U.S. PATENT DOCUMENTS

| | | |
|---|---|---|
| 2018/0086264 A1 | 3/2018 | Pedersen |
| 2018/0106885 A1 | 4/2018 | Blayvas |
| 2018/0120420 A1 | 5/2018 | McMahon et al. |
| 2018/0168552 A1 | 6/2018 | Shi et al. |
| 2018/0180706 A1 | 6/2018 | Li et al. |
| 2018/0288587 A1 | 10/2018 | Allegue Martinez et al. |
| 2018/0330293 A1 | 11/2018 | Kulkarni et al. |
| 2019/0033446 A1 | 1/2019 | Bultan et al. |
| 2019/0156943 A1 | 5/2019 | Kocherscheidt et al. |
| 2019/0272718 A1 | 9/2019 | Hurtig et al. |

FOREIGN PATENT DOCUMENTS

| | | |
|---|---|---|
| JP | 1997-507298 | 7/1997 |
| JP | 2004286567 | 10/2004 |
| JP | 2013072865 | 4/2013 |
| WO | 2014021574 | 2/2014 |
| WO | 2014201574 | 12/2014 |
| WO | 2015/168700 | 11/2015 |
| WO | 2016005977 | 1/2016 |
| WO | 2016066822 | 5/2016 |
| WO | 2016110844 | 7/2016 |
| WO | 2017106976 | 6/2017 |
| WO | 2017132765 | 8/2017 |
| WO | 2017177303 | 10/2017 |
| WO | 2017210770 | 12/2017 |
| WO | 2018094502 | 5/2018 |
| WO | 2019041019 | 3/2019 |

OTHER PUBLICATIONS

Domenico, et al., "Exploring Training Options for RF Sensing Using CSI", IEEE Communications Magazine, 2018, vol. 56, Issue 5, pp. 116-123, 8 pgs.

Iqbal, et al., "Indoor Motion Classification Using Passive RF Sensing Incorporating Deep Learning", ISSN: 2577-2465, Electronic IEEE, Jun. 3, 2018, 5 pgs.

Kosba, et al., "Robust WLAN Device-free Passive Motion Detection", IEEE Wireless Communications and Networking Conference, Apr. 2012, 6 pgs.

Youssef, Moustafa, et al., "Challenges: Device-free Passive Localization for Wireless Environments", Mobicom 07 Proceedings of the 13th Annual ACM International Conference on Mobile Computing and Networking, Sep. 2007, 11 pgs.

\* cited by examiner

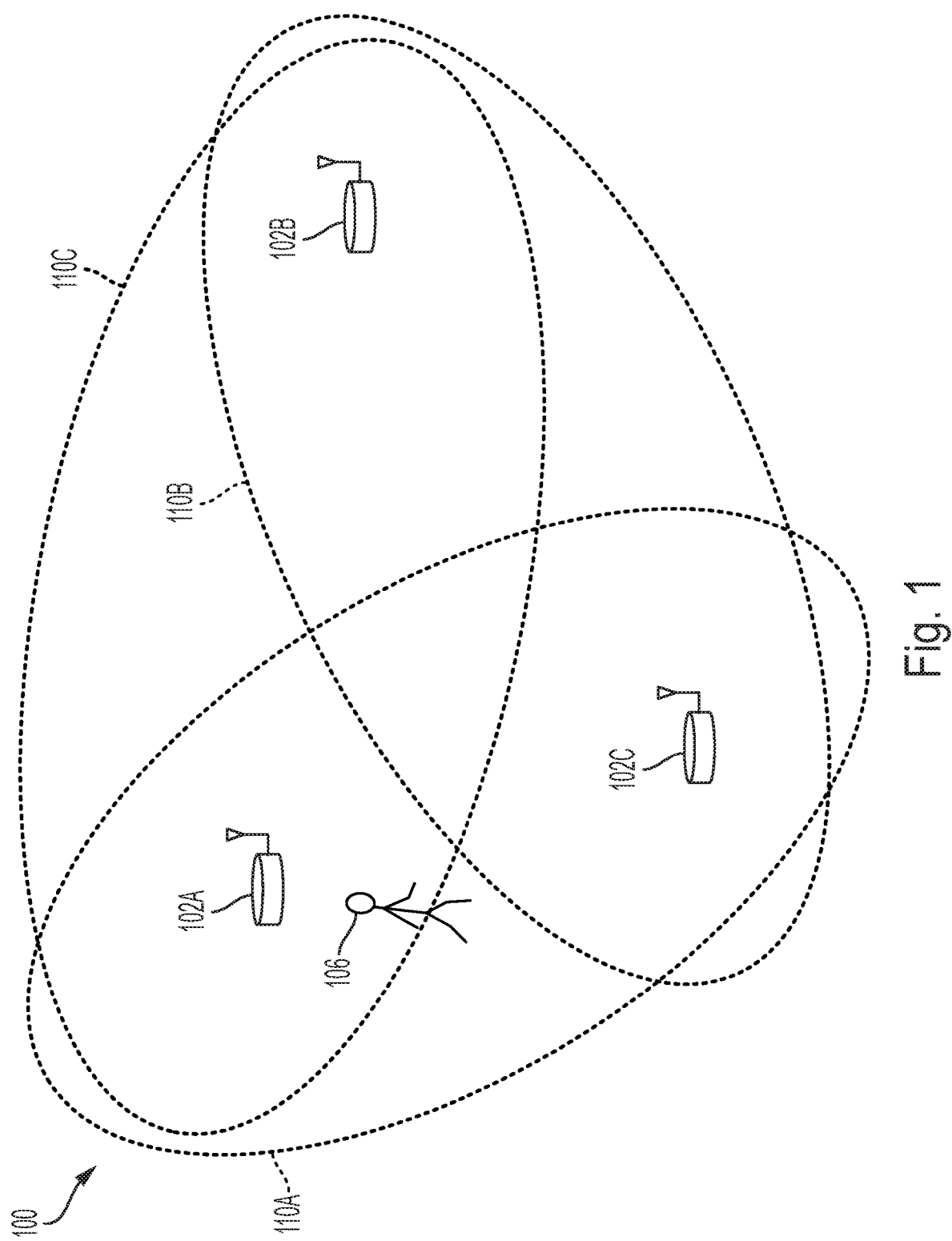

CONTROLLING WIRELESS CONNECTIONS IN WIRELESS SENSING SYSTEMS

CROSS-REFERENCE TO RELATED APPLICATIONS

This application claims priority to U.S. Provisional Application No. 62/840,668 entitled "Controlling Measurement Rates, Wireless Connections and Device Participation in Wireless Motion Detection Systems" and filed Apr. 30, 2019. The priority application is hereby incorporated by reference.

BACKGROUND

The following description relates to controlling wireless connections in wireless sensing systems.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems, and other types of systems.

DESCRIPTION OF DRAWINGS

FIG. 1 is a diagram showing an example wireless communication system.

DETAILED DESCRIPTION

Figure 2A:
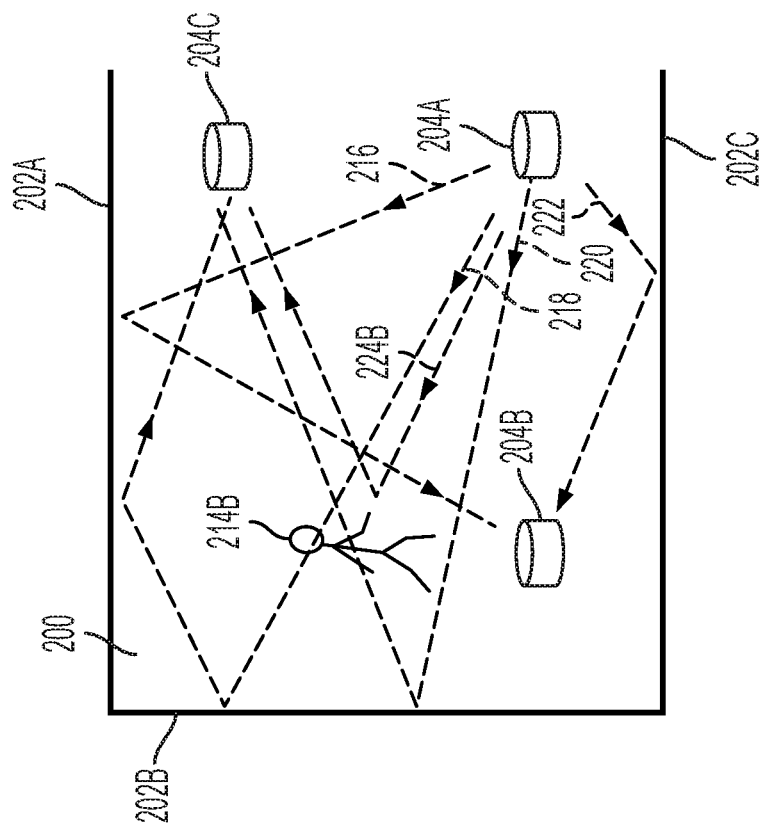
FIGS. 2A-2B are diagrams showing example wireless signals communicated between wireless communication devices.

In some aspects of what is described here, a wireless sensing system can be used for a variety of wireless sensing applications by processing wireless signals (e.g., radio frequency signals) transmitted through a space between wireless communication devices. Example wireless sensing applications include motion detection, which can include the following: detecting motion of objects in the space, motion tracking, breathing detection, breathing monitoring, presence detection, gesture detection, gesture recognition, human detection (moving and stationary human detection), human tracking, fall detection, speed estimation, intrusion detection, walking detection, step counting, respiration rate detection, apnea estimation, posture change detection, activity recognition, gait rate classification, gesture decoding, sign language recognition, hand tracking, heart rate estimation, breathing rate estimation, room occupancy detection, human dynamics monitoring, and other types of motion detection applications. Other examples of wireless sensing applications include object recognition, speaking recognition, keystroke detection and recognition, tamper detection, touch detection, attack detection, user authentication, driver fatigue detection, traffic monitoring, smoking detection, school violence detection, human counting, metal detection, human recognition, bike localization, human queue estimation, WiFi imaging, and other types of wireless sensing applications. For instance, the wireless sensing system may operate as a motion detection system to detect the existence and location of motion based on Wi-Fi signals or other types of wireless signals. As described in more detail below, a wireless sensing system may be configured to control measurement rates, wireless connections and device participation, for example, to improve system operation or to achieve other technical advantages. The system improvements and technical advantages achieved when the wireless sensing system is used for motion detection are also achieved in examples where the wireless sensing system is used for another type of wireless sensing application.

In some example wireless sensing systems, a wireless signal includes a component (e.g., a synchronization preamble in a Wi-Fi PHY frame, or another type of component) that wireless devices can use to estimate a channel response or other channel information, and the wireless sensing system can detect motion (or another characteristic depending on the wireless sensing application) by analyzing changes in the channel information collected over time. In some examples, a wireless sensing system can operate similar to a bistatic radar system, where a Wi-Fi access-point (AP) assumes the receiver role, and each Wi-Fi device (stations or nodes or peers) connected to the AP assume the transmitter role. The wireless sensing system may trigger a connected device to generate a transmission, and produce a channel response measurement at a receiver device. This triggering process can be repeated periodically to obtain a sequence of time variant measurements. A wireless sensing algorithm may then receive the generated time-series of channel response measurements (e.g., computed by Wi-Fi receivers) as input, and through a correlation or filtering process, may then make a determination (e.g., determine if there is motion or no motion within the environment represented by the channel response, for example, based on changes or patterns in the channel estimations). In examples where the wireless sensing system detects motion, it may also be possible to identify a location of the motion within the environment based on motion detection results among a number of wireless devices.

Accordingly, wireless signals received at each of the wireless communication devices in a wireless communication network may be analyzed to determine channel information for the various communication links (between respective pairs of wireless communication devices) in the network. The channel information may be representative of a physical medium that applies a transfer function to wireless signals that traverse a space. In some instances, the channel information includes a channel response. Channel responses can characterize a physical communication path, representing the combined effect of, for example, scattering, fading, and power decay within the space between the transmitter and receiver. In some instances, the channel information includes beamforming state information (e.g., a feedback matrix, a steering matrix, channel state information (CSI), etc.) provided by a beamforming system. Beamforming is a signal processing technique often used in multi antenna (multiple-input/multiple-output (MIMO)) radio systems for directional signal transmission or reception. Beamforming can be achieved by operating elements in an antenna array in such a way that signals at particular angles experience constructive interference while others experience destructive interference.

The channel information for each of the communication links may be analyzed (e.g., by a hub device or other device in a wireless communication network, or a remote device communicably coupled to the network) to, for example, detect whether motion has occurred in the space, to determine a relative location of the detected motion, or both. In some aspects, the channel information for each of the communication links may be analyzed to detect whether an object is present or absent, e.g., when no motion is detected in the space.

Example motion detection and localization algorithms that can be used to detect motion based on wireless signals include the techniques described in U.S. Pat. No. 9,523,760 entitled "Detecting Motion Based on Repeated Wireless Transmissions," U.S. Pat. No. 9,584,974 entitled "Detecting Motion Based on Reference Signal Transmissions," U.S. Pat. No. 10,051,414 entitled "Detecting Motion Based On Decompositions Of Channel Response Variations," U.S. Pat. No. 10,048,350 entitled "Motion Detection Based on Groupings of Statistical Parameters of Wireless Signals," U.S. Pat. No. 10,108,903 entitled "Motion Detection Based on Machine Learning of Wireless Signal Properties," U.S. Pat. No. 10,109,167 entitled "Motion Localization in a Wireless Mesh Network Based on Motion Indicator Values," U.S. Pat. No. 10,109,168 entitled "Motion Localization Based on Channel Response Characteristics," and other techniques.

In some cases, a wireless sensing system can control a node measurement rate. For instance, a Wi-Fi motion system may configure variable measurement rates (e.g., channel estimation/environment measurement/sampling rates) based on criteria given by a current wireless sensing application (e.g., motion detection). In some implementations, when no motion is present or detected for a period of time, for example, the wireless sensing system can reduce the rate that the environment is measured, such that the connected device will be triggered less frequently. In some implementations, when motion is present, for example, the wireless sensing system can increase the triggering rate to produce a time-series of measurements with finer time resolution. Controlling the variable measurement rate can allow energy conservation (through the device triggering), reduce processing (less data to correlate or filter), and improve resolution during specified times.

In some cases, a wireless sensing system can perform band steering or client steering of nodes throughout a wireless network, for example, in a Wi-Fi multi-AP or Extended Service Set (ESS) topology, multiple coordinating wireless access-points (APs) each provide a Basic Service Set (BSS) which may occupy different frequency bands and allow devices to transparently move between from one participating AP to another (e.g., mesh). For instance, within a home mesh network, Wi-Fi devices can connect to any of the APs, but typically select one with a good signal strength. The coverage footprint of the mesh APs typically overlap, often putting each device within communication range or more than one AP. If the AP supports multi-bands (e.g., 2.4G and 5G), the wireless sensing system may keep a device connected to the same physical AP, but instruct it to use a different frequency band in order to obtain more diverse information to help improve the accuracy or results of the wireless sensing algorithm (e.g., motion detection algorithm). In some implementations, the wireless sensing system can change a device from being connected to one mesh AP to being connected to another mesh AP. Such device steering can be performed, for example, during wireless sensing (e.g., motion detection), based on criteria detected in a specific area, in order to improve detection coverage, or to better localize motion within an area.

In some cases, a wireless sensing system can allow devices to dynamically indicate and communicate their wireless sensing capability or wireless sensing willingness to the wireless sensing system. For example, there may be times when a device does not want to be periodically interrupted or triggered to transmit a wireless signal that would allow the AP to produce a channel measurement. For instance, if a device is sleeping, frequently waking the device up to transmit or receive wireless sensing signals could consume resources (e.g., causing a cell-phone battery to die faster). These and other types of events could make a device willing or not willing to participate in wireless sensing system operations. In some cases, a cell phone running on its battery may not want to participate, but when the cell phone is plugged into the charger, it may be willing to participate. Accordingly, if the cell phone is unplugged, it may indicate to the wireless sensing system to exclude the cell phone from participating; whereas if the cell phone is plugged in, it may indicate to the wireless sensing system to include the cell phone in wireless sensing system operations. In some cases, if a device is under load (e.g., a device streaming audio or video) or busy performing a primary function, the device may not want to participate; whereas when the same device's load is reduced and participating will not interfere with a primary function, the device may indicate to the wireless sensing system that it is willing to participate.

Example wireless sensing systems are described below in the context of motion detection (detecting motion of objects in the space, motion tracking, breathing detection, breathing monitoring, presence detection, gesture detection, gesture recognition, human detection (moving and stationary human detection), human tracking, fall detection, speed estimation, intrusion detection, walking detection, step counting, respiration rate detection, apnea estimation, posture change detection, activity recognition, gait rate classification, gesture decoding, sign language recognition, hand tracking, heart rate estimation, breathing rate estimation, room occupancy detection, human dynamics monitoring, and other types of motion detection applications). However, the operation, system improvements, and technical advantages achieved when the wireless sensing system is operating as a motion detection system are also applicable in examples where the wireless sensing system is used for another type of wireless sensing application.

FIG. 1 illustrates an example wireless communication system 100. The example wireless communication system 100 includes three wireless communication devices 102A, 102B, 102C. The example wireless communication system 100 may include additional wireless communication devices 102 and/or other components (e.g., one or more network servers, network routers, network switches, cables, or other communication links, etc.).

The example wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others.

In some implementations, the wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); 5G standards, and others.

In some cases, one or more of the wireless communication devices 102 is a Wi-Fi access point or another type of wireless access point (WAP). In some cases, one or more of the wireless communication devices 102 is an access point of a wireless mesh network, such as, for example, a commercially-available mesh network system (e.g., Plume Wi-Fi, Google Wi-Fi, Qualcomm Wi-Fi SoN, etc.). In some instances, one or more of the wireless communication devices 102 can be implemented as wireless access points (APs) in a mesh network, while the other wireless communication device(s) 102 are implemented as leaf devices (e.g., mobile devices, smart devices, etc.) that access the mesh network through one of the APs. In some cases, one or more of the wireless communication devices 102 is a mobile device (e.g., a smartphone, a smart watch, a tablet, a laptop computer, etc.), a wireless-enabled device (e.g., a smart thermostat, a Wi-Fi enabled camera, a smart TV), or another type of device that communicates in a wireless network.

In the example shown in FIG. 1, the wireless communication devices transmit wireless signals to each other over wireless communication links (e.g., according to a wireless network standard or a non-standard wireless communication protocol), and the wireless signals communicated between the devices can be used as motion probes to detect motion of objects in the signal paths between the devices. In some implementations, standard signals (e.g., channel sounding signals, beacon signals), non-standard reference signals, or other types of wireless signals can be used as motion probes.

In the example shown in FIG. 1, the wireless communication link between the wireless communication devices 102A, 102C can be used to probe a first motion detection zone 110A, the wireless communication link between the wireless communication devices 102B, 102C can be used to probe a second motion detection zone 110B, and the wireless communication link between the wireless communication device 102A, 102B can be used to probe a third motion detection zone 110C. In some instances, the motion detection zones 110 can include, for example, air, solid materials, liquids, or another medium through which wireless electromagnetic signals may propagate.

In the example shown in FIG. 1, when an object moves in any of the motion detection zones 110, the motion detection system may detect the motion based on signals transmitted through the relevant motion detection zone 110. Generally, the object can be any type of static or moveable object, and can be living or inanimate. For example, the object can be a human (e.g., the person 106 shown in FIG. 1), an animal, an inorganic object, or another device, apparatus, or assembly, an object that defines all or part of the boundary of a space (e.g., a wall, door, window, etc.), or another type of object.

In some examples, the wireless signals may propagate through a structure (e.g., a wall) before or after interacting with a moving object, which may allow the moving object's movement to be detected without an optical line-of-sight between the moving object and the transmission or receiving hardware. In some instances, the motion detection system may communicate the motion detection event to another device or system, such as a security system or a control center.

In some cases, the wireless communication devices 102 themselves are configured to perform one or more operations of the motion detection system, for example, by executing computer-readable instructions (e.g., software or firmware) on the wireless communication devices. For example, each device may process received wireless signals to detect motion based on changes detected in the communication channel. In some cases, another device (e.g., a remote server, a network-attached device, etc.) is configured to perform one or more operations of the motion detection system. For example, each wireless communication device 102 may send channel information to central device or system that performs operations of the motion detection system.

In an example aspect of operation, wireless communication devices 102A, 102B may broadcast wireless signals or address wireless signals to the other wireless communication device 102C, and the wireless communication device 102C (and potentially other devices) receives the wireless signals transmitted by the wireless communication devices 102A, 102B. The wireless communication device 102C (or another system or device) then processes the received wireless signals to detect motion of an object in a space accessed by the wireless signals (e.g., in the zones 110A, 11B). In some instances, the wireless communication device 102C (or another system or device) may perform one or more operations shown in or described with respect to any of FIGS. 2A-2B, 3, 4, 5A-5B, 6, 7A-7B, 8, 9, 10A-10B, 11 and 12, or another type of process for detecting motion.

Figure 2B:
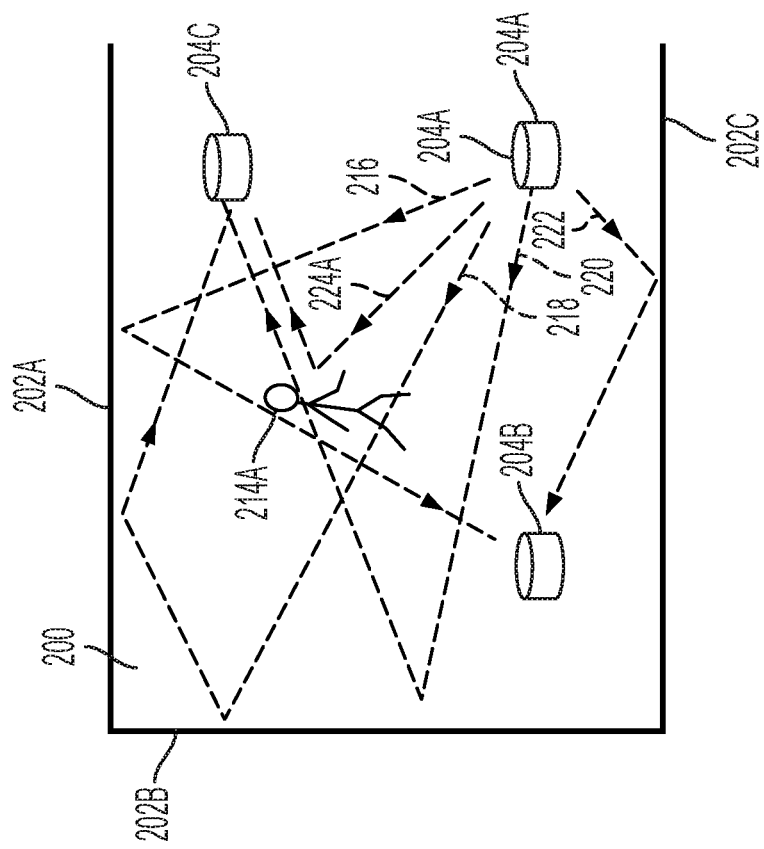

FIGS. 2A and 2B are diagrams showing example wireless signals communicated between wireless communication devices 204A, 204B, 204C. The wireless communication devices 204A, 204B, 204C may be, for example, the wireless communication devices 102A, 102B, 102C shown in FIG. 1, or may be other types of wireless communication devices.

In some cases, a combination of one or more of the wireless communication devices 204A, 204B, 204C can be part of, or may be used by, a motion detection system. The example wireless communication devices 204A, 204B, 204C can transmit wireless signals through a space 200. The example space 200 may be completely or partially enclosed or open at one or more boundaries of the space 200. The space 200 may be or may include an interior of a room, multiple rooms, a building, an indoor area, outdoor area, or the like. A first wall 202A, a second wall 202B, and a third wall 202C at least partially enclose the space 200 in the example shown.

In the example shown in FIGS. 2A and 2B, the first wireless communication device 204A transmits wireless motion probe signals repeatedly (e.g., periodically, intermittently, at scheduled, unscheduled or random intervals, etc.). The second and third wireless communication devices 204B, 204C receive signals based on the motion probe signals transmitted by the wireless communication device 204A.

As shown, an object is in a first position 214A at an initial time (t0) in FIG. 2A, and the object has moved to a second position 214B at subsequent time (t1) in FIG. 2B. In FIGS. 2A and 2B, the moving object in the space 200 is represented as a human, but the moving object can be another type of object. For example, the moving object can be an animal, an inorganic object (e.g., a system, device, apparatus, or assembly), an object that defines all or part of the boundary of the space 200 (e.g., a wall, door, window, etc.), or another type of object.

As shown in FIGS. 2A and 2B, multiple example paths of the wireless signals transmitted from the first wireless communication device 204A are illustrated by dashed lines. Along a first signal path 216, the wireless signal is transmitted from the first wireless communication device 204A and reflected off the first wall 202A toward the second wireless communication device 204B. Along a second signal path 218, the wireless signal is transmitted from the first wireless communication device 204A and reflected off the second wall 202B and the first wall 202A toward the third wireless communication device 204C. Along a third signal path 220, the wireless signal is transmitted from the first wireless communication device 204A and reflected off the second wall 202B toward the third wireless communication device 204C. Along a fourth signal path 222, the wireless signal is transmitted from the first wireless communication device 204A and reflected off the third wall 202C toward the second wireless communication device 204B.

In FIG. 2A, along a fifth signal path 224A, the wireless signal is transmitted from the first wireless communication device 204A and reflected off the object at the first position 214A toward the third wireless communication device 204C. Between time t0 in FIG. 2A and time t1 in FIG. 2B, the object moves from the first position 214A to a second position 214B in the space 200 (e.g., some distance away from the first position 214A). In FIG. 2B, along a sixth signal path 224B, the wireless signal is transmitted from the first wireless communication device 204A and reflected off the object at the second position 214B toward the third wireless communication device 204C. The sixth signal path 224B depicted in FIG. 2B is longer than the fifth signal path 224A depicted in FIG. 2A due to the movement of the object from the first position 214A to the second position 214B. In some examples, a signal path can be added, removed, or otherwise modified due to movement of an object in a space.

The example wireless signals shown in FIGS. 2A and 2B may experience attenuation, frequency shifts, phase shifts, or other effects through their respective paths and may have portions that propagate in another direction, for example, through the walls 202A, 202B, and 202C. In some examples, the wireless signals are radio frequency (RF) signals. The wireless signals may include other types of signals.

The transmitted signal may have a number of frequency components in a frequency bandwidth. The transmitted signal may be transmitted from the first wireless communication device 204A in an omnidirectional manner, in a directional manner or otherwise. In the example shown, the wireless signals traverse multiple respective paths in the space 200, and the signal along each path may become attenuated due to path losses, scattering, reflection, or the like and may have a phase or frequency offset.

As shown in FIGS. 2A and 2B, the signals from various paths 216, 218, 220, 222, 224A, and 224B combine at the third wireless communication device 204C and the second wireless communication device 204B to form received signals. Because of the effects of the multiple paths in the space 200 on the transmitted signal, the space 200 may be represented as a transfer function (e.g., a filter) in which the transmitted signal is input and the received signal is output. When an object moves in the space 200, the attenuation or phase offset affected upon a signal in a signal path can change, and hence, the transfer function of the space 200 can change. When the same wireless signal is transmitted from the first wireless communication device 204A, if the transfer function of the space 200 changes, the output of that transfer function, e.g. the received signal, will also change. A change in the received signal can be used to detect movement of an object. Conversely, in some cases, if the transfer function of the space does not change, the output of the transfer function—the received signal—will not change.

Mathematically, a transmitted signal f (t) transmitted from the first wireless communication device 204A may be described according to Equation (1):

$$f(t) = \sum_{n=-\infty}^{\infty} c_n e^{j\omega_n t} \quad (1)$$

where $\omega_n$ represents the frequency of $n^{th}$ frequency component of the transmitted signal, $c_n$ represents the complex coefficient of the $n^{th}$ frequency component, and t represents time. With the transmitted signal f (t) being transmitted from the first wireless communication device 204A, an output signal $r_k(t)$ from a path k may be described according to Equation (2):

$$r_k(t) = \sum_{n=-\infty}^{\infty} \alpha_{n,k} c_n e^{j(\omega_n t + \phi_{n,k})} \quad (2)$$

where $\alpha_{n,k}$ represents an attenuation factor (or channel response; e.g., due to scattering, reflection, and path losses)

for the $n^{th}$ frequency component along path k, and $\phi_{n,k}$ represents the phase of the signal for $n^{th}$ frequency component along path k. Then, the received signal R at a wireless communication device can be described as the summation of all output signals $r_k(t)$ from all paths to the wireless communication device, which is shown in Equation (3):

$$R = \sum_{k} r_k(t) \qquad (3)$$

Substituting Equation (2) into Equation (3) renders the following Equation (4):

$$R = \sum_{k} \sum_{n=-\infty}^{\infty} (\alpha_{n,k} e^{j\phi_{n,k}}) c_n e^{j\omega_n t} \qquad (4)$$

The received signal R at a wireless communication device can then be analyzed, for example, to detect motion. The received signal R at a wireless communication device can be transformed to the frequency domain, for example, using a Fast Fourier Transform (FFT) or another type of algorithm. The transformed signal can represent the received signal R as a series of n complex values, one for each of the respective frequency components (at the n frequencies $\omega_n$). For a frequency component at frequency $\omega_n$, a complex value $Y_n$ may be represented as follows in Equation (5):

$$Y_n = \sum_{k} c_n \alpha_{n,k} e^{j\phi_{n,k}}. \qquad (5)$$

The complex value $Y_n$ for a given frequency component $\omega_n$ indicates a relative magnitude and phase offset of the received signal at that frequency component $\omega_n$. When an object moves in the space, the complex value $Y_n$ changes due to the channel response $\alpha_{n,k}$ of the space changing. Accordingly, a change detected in the channel response (and thus, the complex value $Y_n$) can be indicative of movement of an object within the communication channel. Conversely, a stable channel response may indicate lack of movement. Thus, in some implementations, the complex values $Y_n$ for each of multiple devices in a wireless network can be processed to detect whether motion has occurred in a space traversed by the transmitted signals f (t).

In another aspect of FIGS. 2A and 2B, beamforming may be performed between devices based on some knowledge of the communication channel (e.g., through feedback properties generated by a receiver), which can be used to generate one or more steering properties (e.g., a steering matrix) that are applied by a transmitter device to shape the transmitted beam/signal in a particular direction or directions. Thus, changes to the steering or feedback properties used in the beamforming process indicate changes, which may be caused by moving objects, in the space accessed by the wireless communication system. For example, motion may be detected by substantial changes in the communication channel, e.g. as indicated by a channel response, or steering or feedback properties, or any combination thereof, over a period of time.

In some implementations, for example, a steering matrix may be generated at a transmitter device (beamformer) based on a feedback matrix provided by a receiver device (beamformee) based on channel sounding. Because the steering and feedback matrices are related to propagation characteristics of the channel, these matrices change as objects move within the channel. Changes in the channel characteristics are accordingly reflected in these matrices, and by analyzing the matrices, motion can be detected, and different characteristics of the detected motion can be determined. In some implementations, a spatial map may be generated based on one or more beamforming matrices. The spatial map may indicate a general direction of an object in a space relative to a wireless communication device. In some cases, "modes" of a beamforming matrix (e.g., a feedback matrix or steering matrix) can be used to generate the spatial map. The spatial map may be used to detect the presence of motion in the space or to detect a location of the detected motion.

In some instances, a motion detection system can control a variable device measurement rate in a motion detection process. For example, a feedback control system for a multi-node wireless motion detection system may adaptively change the sample rate based on the environment conditions. In some cases, such controls can improve operation of the motion detection system or provide other technical advantages. For example, the measurement rate may be controlled in a manner that optimizes or otherwise improves air-time usage vs detection ability suitable for a wide range of different environments and different motion detection applications. The measurement rate may be controlled in a manner that reduces redundant measurement data to be processed, thereby reducing processor load/power requirements. In some cases, the measurement rate is controlled in a manner that is adaptive, for instance, an adaptive sample can be controlled individually for each participating device. An adaptive sample rate can be used with a tuning control loop for different use cases, or device characteristics.

Figure 3:
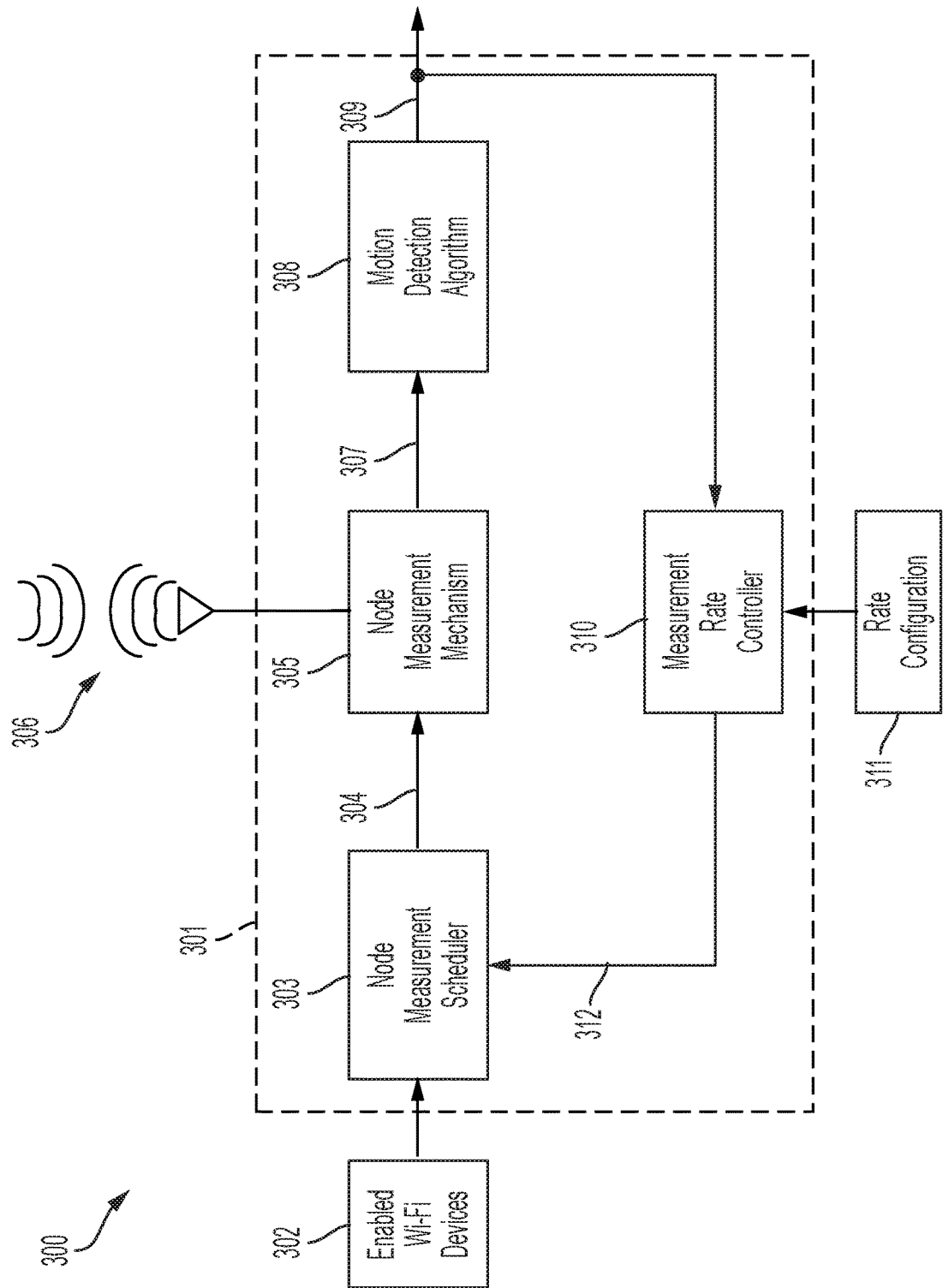
FIG. 3 is a block diagram showing aspects of an example motion detection system.

FIG. 3 is a block diagram showing aspects of an example motion detection system 300. The example motion detection system 300 shown in FIG. 3 provides variable measurement rate control functionality. As shown in FIG. 3, the example motion detection system 300 includes a wireless communication device 301 that includes various modules, which may be implemented, for instance, as software, hardware, firmware or a combinations thereof.

In the example shown in FIG. 3, the enabled Wi-Fi devices list 302 is a system input that includes a list of Wi-Fi devices enabled and participating in the Wi-Fi motion detection network. In this example, only these Wi-Fi nodes will be used (e.g., as bi-static radar transmitters) for motion detection operations. As shown in FIG. 3, the list 302 is fed into the Node Measurement Scheduler 303 to identify all nodes which are used to produce measurements.

In the example shown in FIG. 3, the Node Measurement Scheduler 303 is configured to schedule a time for each enabled Wi-Fi node when it is due to produce a measurement. In some cases, all measurements are periodic, and are to be performed at the rate determined by an input rate configuration 311. Each Wi-Fi node may have a corresponding rate associated with it.

In the example shown in FIG. 3, the Node Measurement Scheduler Output Signal 304 is asserted when the time is due to perform a measurement. The signal 304 may include a Wi-Fi device identifier, and when asserted will indicate to the Node Measurement Mechanism 305 that the channel response from the given Wi-Fi device is to be sampled. In some examples, the signal 304 is asserted once per Wi-Fi device per sample.

In the example shown in FIG. 3, the Node Measurement Mechanism 305 triggers each device to send or receive wireless signals for motion detection. For example, several Wi-Fi devices may participate in a Wi-Fi motion detection network (e.g., operating as bi-static radar transmitters), and the Node Measurement Mechanism 305 may trigger the devices to transmit or illuminate the channel. The triggering mechanism may be included in a pre-existing Wi-Fi protocol or standard, and the signal 304 may be used to determine which Wi-Fi device is to be triggered, and when the triggering mechanism is to be performed. Once a device has been triggered, the device illuminates the channel with a known transmission waveform which will be sampled locally (e.g., at the wireless communication device 301) to obtain a channel measurement. The resulting measurement sample can be provided as an output signal 307, along with an identifier of the corresponding Wi-Fi node which was used to produce the sample.

The example wireless communication device 301 shown in FIG. 3 includes an RF interface 306. The RF interface 306 can be used to send and receive radio frequency (RF) signals, for example, according to a Wi-Fi standard or other protocol. In some cases, each measurement of the channel includes a bi-directional over-the-air exchange, in which another Wi-Fi device is first triggered (instructed to illuminate the channel), and then the Wi-Fi device responds with an illumination transmission. In some instances, frequent measurements may consume air time and generate redundant data, and a feedback control system may dynamically adjust this utilization.

In the example shown in FIG. 3, the output signal 307 can include channel information. In some cases, the output signal 307 includes a channel measurement sample, along with information identifying the node that was used to produce the sample. This information can be provided as the input to the Motion Detection Algorithm 308.

In the example shown in FIG. 3, the Motion Detection Algorithm 308 processes each measurement sample and generates a motion detection result. In some cases, the Motion Detection Algorithm 308 receives a variable time series of measurements (e.g., output signals 307) for each participating Wi-Fi device, and through a computational process determine whether motion occurred in the environment illuminated by the corresponding device. A computation cycle may be initiated upon receiving each new sample, or a block of N samples. An output signal 309 may be generated (or updated) each time the algorithm completes a computation cycle. In some cases, when more than one participating Wi-Fi device is contributing, the motion detection algorithm may localize the detected motion (e.g., to one or more illuminating devices). For example, if motion is detected in the environment illuminated by device-A, but no motion was detected in the environment illuminated by device-B, the motion may be localized to device-A.

In the example shown in FIG. 3, the Motion Detection Algorithm Output 309 produced by the motion detection algorithm 308 includes a motion result, and may also include an indication of which participating Wi-Fi devices the motion has been localized to. In some cases, the motion detection system 300 produces additional outputs. In the example shown in FIG. 3, the Motion Detection Algorithm Output 309 is the feedback signal used by the measurement rate controller 310 to dynamically adjust the sample rate on a device-by-device basis.

In the example shown in FIG. 3, the Measurement Rate Controller 310 determines whether to increase or decrease the sample rate of each participating Wi-Fi device. The determination can be made by evaluating decision criteria. The decision criteria may be based on feedback in the output signal 309 (from the motion detection algorithm 308) and the Rate Configuration 311 (which may be provided by the motion detection application). In some cases, a new decision evaluation can be performed upon each new or updated output signal 309. The Measurement Rate Controller 310 produces the measurement rate control signal 312, which designates the sample rate of each participating Wi-Fi device.

Since different motion detection applications may have different specifications, a rate configuration 311 allows application-specific tuning. The rate configuration 311 may provide limits (e.g., maximum rates, minimum rates), along with time constants to define how fast the rate can change. Accordingly, the Rate Configuration 311 allows the feedback control system to work for a wide range of different use-cases. For example, the motion detection application may need to tune parameters which impact the modified sample rate response. These parameters may be global, or device specific.

In the example shown in FIG. 3, the Measurement Rate Control Signal 312 produced by the Measurement Rate Controller 310 indicates the expected sample rate for each participating Wi-Fi device. This signal 312 is fed into the Node Measurement Scheduler 303 as shown in FIG. 3.

Figure 4:
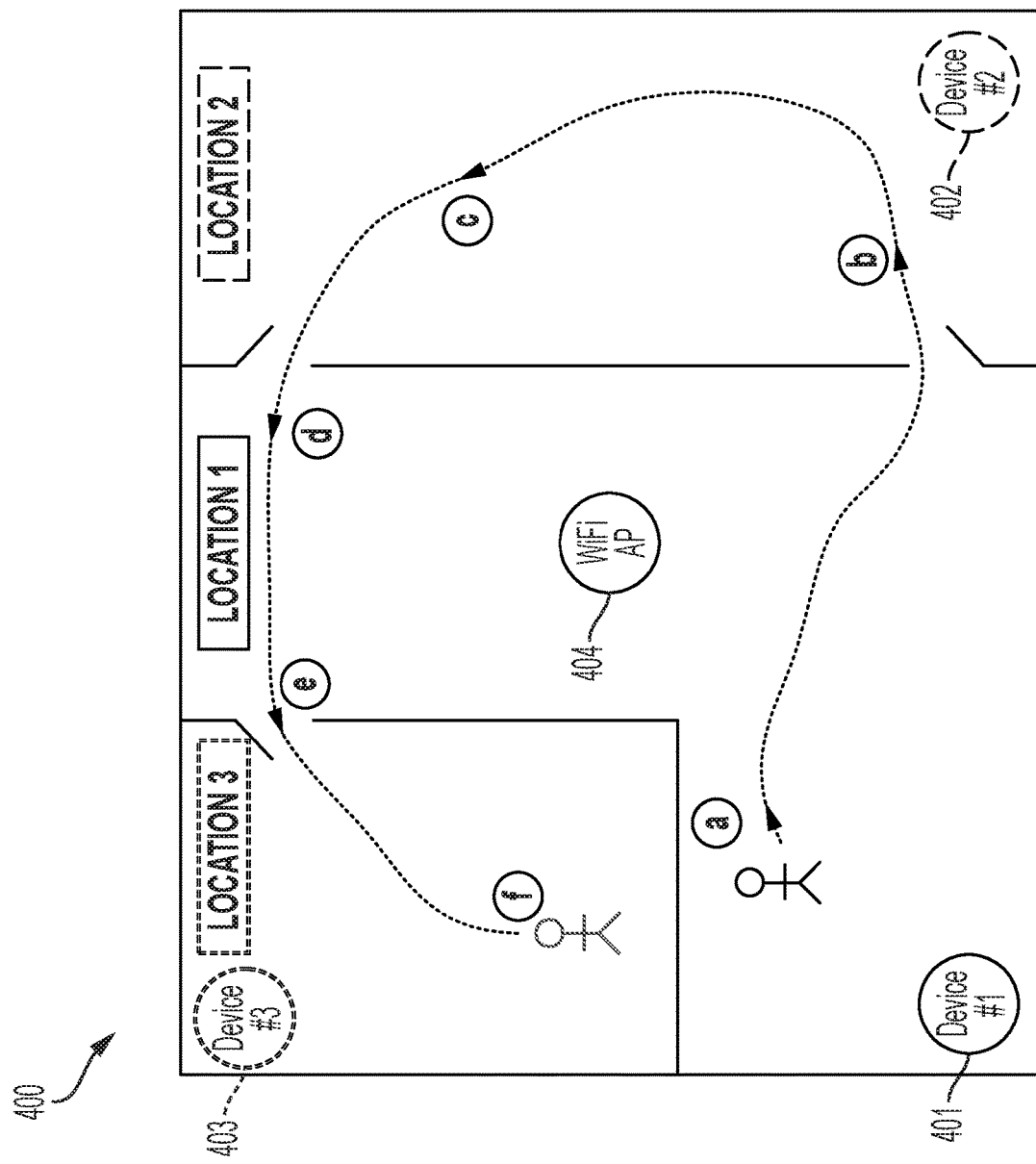
FIG. 4 is a diagram of an example motion detection system operating in a space.

FIG. 4 is a diagram of an example motion detection system operating in a space 400. As shown in FIG. 4, the motion detection system may utilize four wireless communication devices in the space 400—a Wi-Fi access point (AP) 404 and three wireless communication devices 401, 402, 403 connected to the Wi-Fi AP 404. The first wireless communication device 401 is located in "Location 1" which is a first zone (e.g., a room, office, etc.) within the space 400; the second wireless communication device 402 is located in "Location 2" which is a second zone within the space 400; and the third wireless communication device 403 is located in "Location 3" which is a third zone within the space 400. As such, in this example, the Wi-Fi motion detection system uses a single AP, and the detection environment contains 3 distinct locations, where each location has a participating Wi-Fi device.

As shown in FIG. 4, a moving object (e.g., a human walking) follows a path from (a) to (f). While in Location 1, the sample rate of devices 402 and 403 can be reduced as high resolution measurements are made by device 401. Analogous adjustments can be made when the object moves through Locations 2 and 3. For example, the motion detection system can use the measurement rate controller 310 shown in FIG. 3 to provide a reduction in sample rate for each of the devices 401, 402, 403 when no motion present in the location associated with each individual device. In some cases, the reduction in sample rate may introduce a delay when motion first detected, but a motion detection application may account for the delay, for example, by adjusting parameters (e.g., min sample rate, rise-time-constant) in the Rate Configuration 311. Accordingly, the measurement rate controller 310 allows programming of different responses given different motion detection algorithm outputs.

Figure 5A:
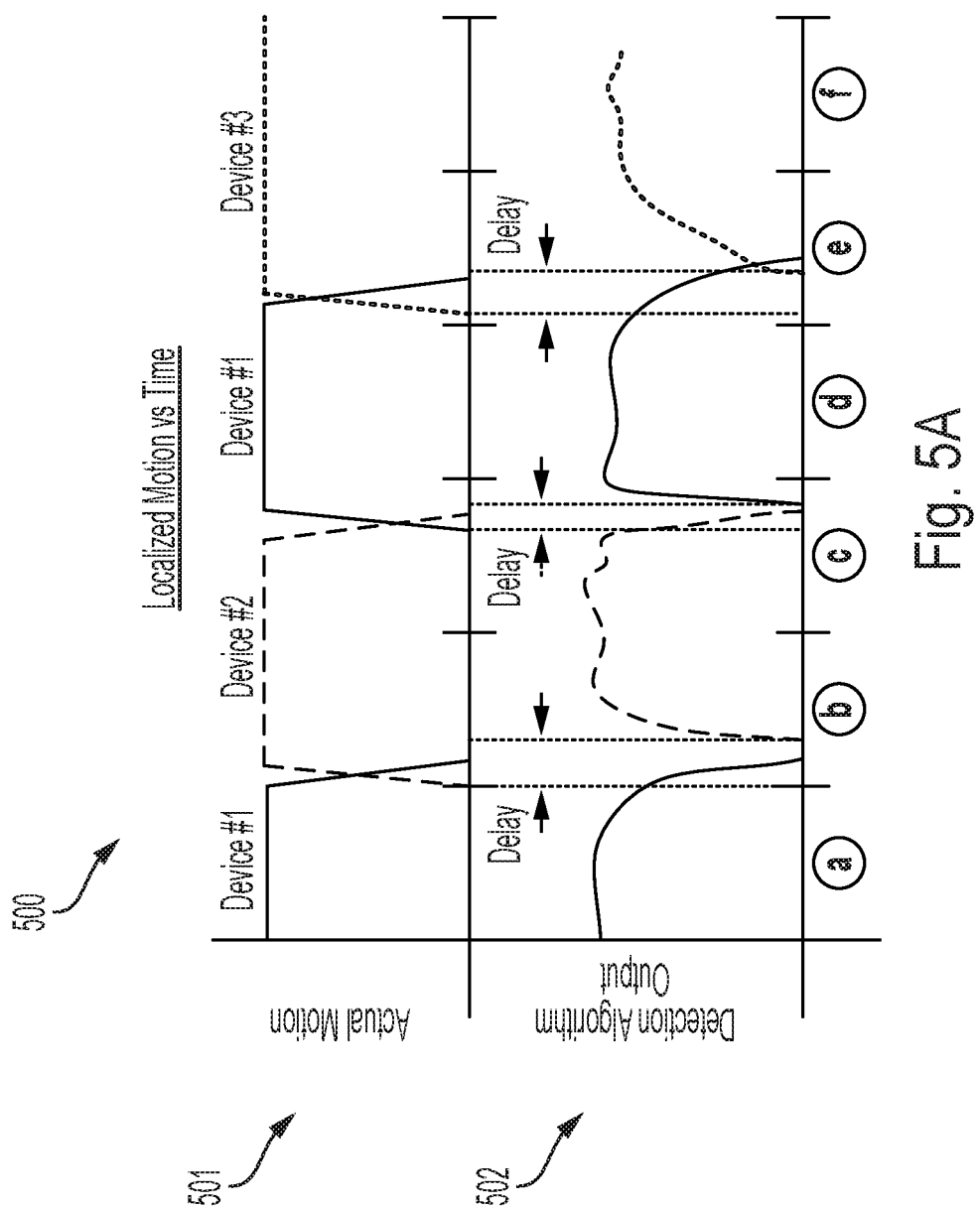
FIG. 5A is a plot showing example motion data from the motion detection system shown in FIG. 4.
Figure 5B:
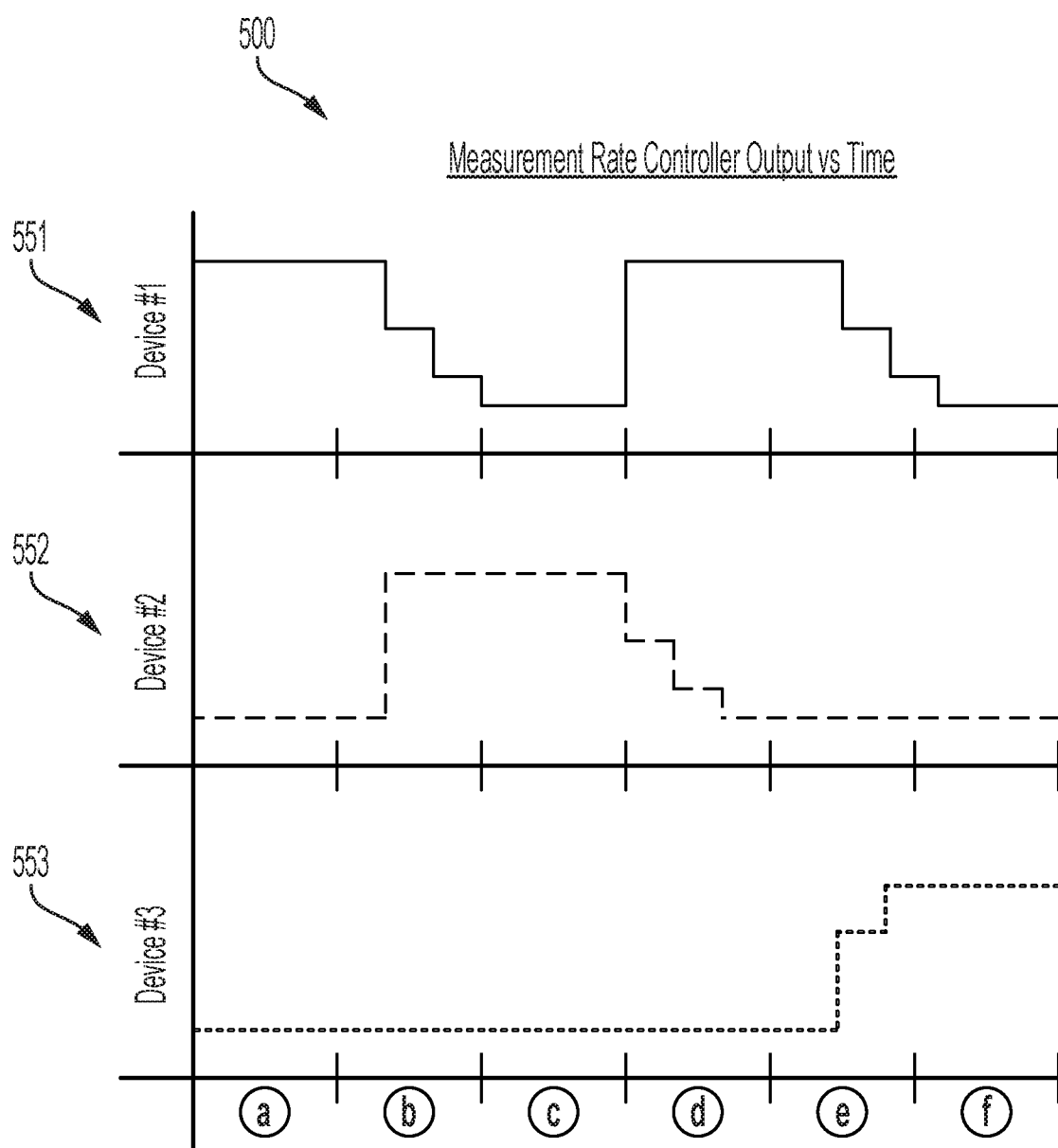
FIG. 5B is a plot showing example measurement rate data based on the motion data shown in FIG. 5A.

FIG. 5A is a plot showing example motion data from the motion detection system shown in FIG. 4, and FIG. 5B is a plot showing example measurement rate data based on the motion data shown in FIG. 5A. The horizontal axis for the plots shown in FIGS. 5A and 5B represents time, and includes labels (a) to (f) for each time segment of the path labeled in FIG. 4.

The top plot 501 in FIG. 5A shows the actual motion in the respective locations associated with each of the wireless communication devices 401, 402, 403 shown in FIG. 4. The bottom plot 502 in FIG. 5A shows the degree of motion detected by each of the respective devices (e.g., as indicated in the output signal 309 from the motion detection algorithm 308 in FIG. 3). As shown the bottom plot 502, there is a delay in detecting motion in each new zone, which in some cases may be caused by the lower sampling rate in the new zone before motion is detected in the new zone. In some implementations, the degree of motion may be expressed as a motion indicator value (MIV) computed by each of the respective devices. For instance, higher MIVs can indicate a high level of channel perturbation (due to the motion detected), while lower MIVs can indicate lower levels of channel perturbation. Higher levels of channel perturbation may indicate motion detected at the device (e.g., near on in close proximity to the device). The MIVs may include aggregate MIVs (representing a degree of motion detected in the aggregate by the device), link MIVs (representing a degree of motion detected on particular communication links between respective devices in the space 400), or a combination thereof. In some implementations, MIVs are normalized, e.g. to a value from zero (0) to one hundred (100).

As the object moves along the path in FIG. 4, the measurement rate of each wireless communication device is adjusted (e.g., by the measurement rate controller 310 in FIG. 3) as shown in FIG. 5B. The top plot 551 in FIG. 5B shows the measurement rate for the first wireless communication device 401; the middle plot 552 in FIG. 5B shows the measurement rate for the second wireless communication device 402; and bottom plot 553 in FIG. 5B shows the measurement rate for the third wireless communication device 403. As shown in FIG. 5B, the measurement rate for each device is increased when motion is detected in the location associated with the device, and the measurement rate for each device is decreased when motion is not detected in the location associated with the device. Specific units of measurement rate are not shown in FIG. 5B, as the measurement rates may be adapted to different scales. In some examples, the measurement rates range from a minimum sample rate of one sample per second to a maximum sample rate of ten samples per second. All devices may have the same range of measurement rates available, or the available range of sample rates may be configured individually for each device.

In some implementations of the example systems and techniques shown and described with respect to FIGS. 3, 4, 5A and 5B, a motion detection system controls the sampling rate on one or more wireless communication links used to detect motion. The sampling rate may indicate, for example, the time duration between wireless signal transmissions on the wireless communication link. For instance, the sampling rate may vary from 200 samples per second (for high time resolution) to one sample per minute (for lower time resolution). In some motion detection systems, a sampling rate of ten samples per second may be used for detecting typical human motion (e.g., in a typical home environment). However, higher sampling rates may be used to detect certain types of events (e.g., high speed movements), and lower sampling rates may be adequate for detecting certain types of events (e.g., slow movements). In some cases, the sampling rate can be limited between a minimum and maximum sampling rate permitted by the sampling hardware and/or components of the motion detection system. For example, sampling too quickly may consume too much computing power, and therefore the processing speed of the RF front end or baseband processor of a wireless communication device may limit the maximum sampling rate. In addition, sampling too slowly may provide inadequate data for accurate motion detection, and therefore the motion detection algorithm may limit the minimum sampling rate.

In some instances, a motion detection system can control band or client steering, for example, to improve operation of the motion detection system. For instance, a feedback control system for a multi access-point or mesh network may dynamically change device connections to improve or otherwise enhance Wi-Fi motion detection performance. In some cases, the control system changes the device connection by changing the frequency band or channel frequency used for communication between two devices. In some cases, the control system changes the device connection by changing which AP the device is connected to. Various optimization algorithms or selection criteria may be provided for different use cases.

In some implementations, a control system that controls the frequency band, frequency channel, AP connection or another device connection attribute (or a combination of them) can improve operation of the motion detection system or provide other technical advantages. For instance, such control system may improve the spatial coverage of the motion detection system (e.g., throughout a home or another type of space), as the control system may adjust network topology to maximize or otherwise expand or target the wireless coverage. In some cases, the control system can improve the diversity of channel information collected, as the control system may change a Wi-Fi device to a different frequency band or channel during a motion event to obtain more diverse information. In some cases, the control system can manage resource and air-time usage, as the control system may dynamically minimize the use of certain resources when no motion present.

Figure 6:
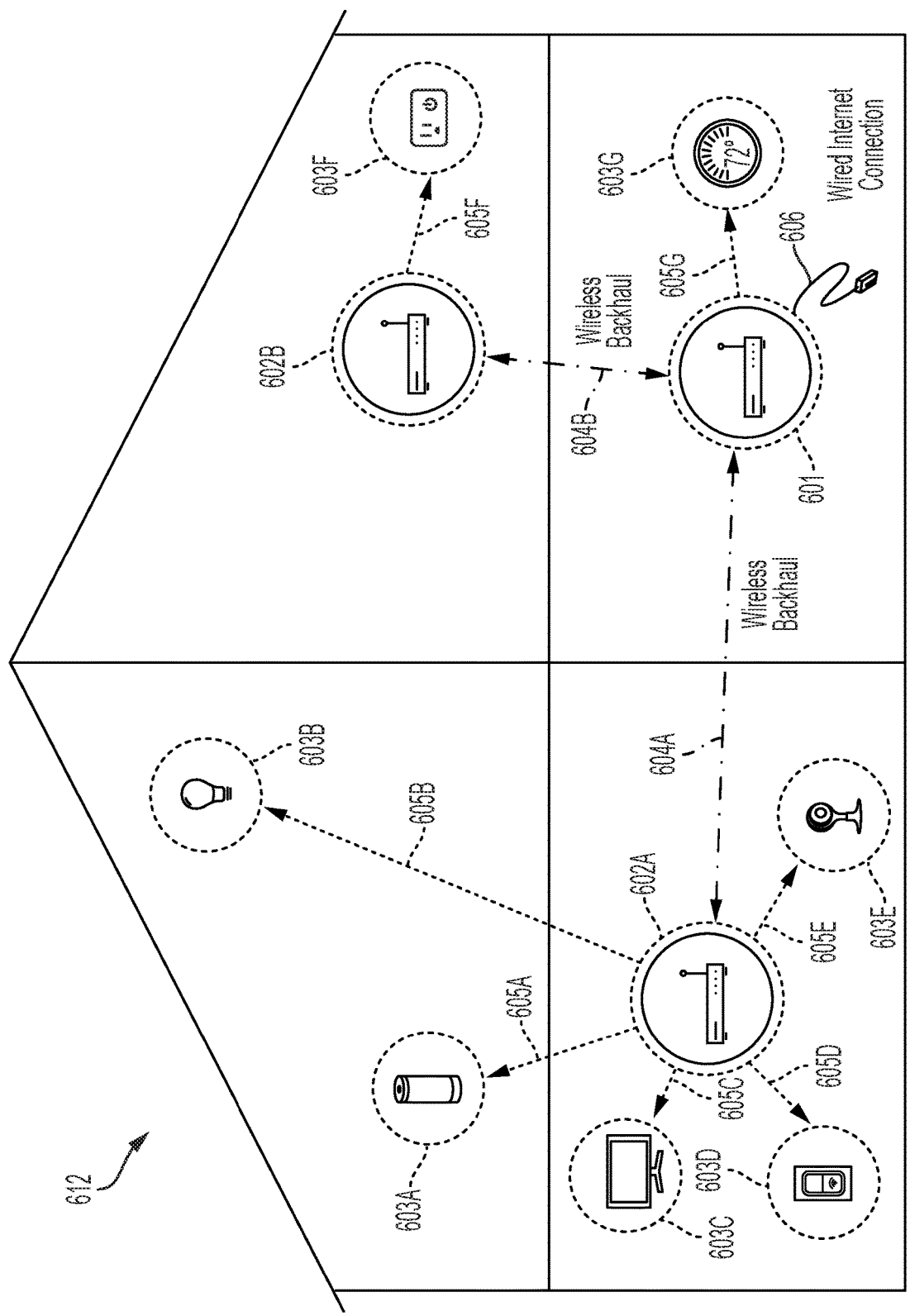
FIG. 6 is a diagram of an example motion detection system operating in a space.

FIG. 6 is a diagram of an example motion detection system operating in a space 612. The example space 612 shown in FIG. 6 is a home that includes multiple distinct spatial regions or zones. In the example shown, the wireless motion detection system uses a multi-AP home network topology (e.g., mesh network or a Self-Organizing-Network (SON)), which includes three access points (APs): a central access point 601 and two extension access points 602A, 602B. In a typical multi-AP home network, each AP typically supports multiple bands (2.4G, 5G, 6G), and multiple bands may be enabled at the same time. Each AP may use a different Wi-Fi channel to serve its clients, as this may allow for better spectrum efficiency.

In the example shown in FIG. 6, the wireless communication network includes a Central Access Point 601. Typically in a multi-AP home Wi-Fi network, one AP will be denoted as the central AP. This selection, which is often managed by manufacturer software running on each AP, is typically the AP that has a wired Internet connection 606. The other APs 602A, 602B connect to the central AP 601 wirelessly, through respective Wireless Backhaul connections 604A, 604B. The central AP 601 may select a wireless channel different from the extension APs to serve its connected clients. A motion detection algorithm running on the central AP 601 may collect and process data (e.g., channel information) corresponding to all local links on the central AP 601 that are participating in the motion detection system operation.

In the example shown in FIG. 6, the extension APs 602A, 602B extend the range of the Central AP 601, by allowing devices to connect to a potentially closer AP or different channel. The end user is generally not aware of which AP the device has connected to, as all services and connectivity would generally be identical. In addition to serving all connected clients, the Extension APs 602A, 602B connect to the Central AP 601 using the wireless backhaul connections 604A, 604B to move network traffic between other APs and provide a gateway to the Internet. Each Extension AP 602A, 602B may select a different channel to serve its connected clients. Like the Central AP 601, a motion processing algorithm running on each extension AP 602A, 602B may collect and process data (e.g., channel information) corresponding to all its local links that are participating in the motion detection system operation.

In the example shown in FIG. 6, Wi-Fi devices 603A, 603B, 603C, 603D, 603E, 603F, 603G connect to either the Central AP 601 or one of the Extension APs 602, using a respective wireless link 605A, 605B, 605C, 605D, 605E, 605F, 605G as shown in FIG. 6. The devices 603A, 603B, 603C, 603D, 603E, 603F, 603G that connect to the multi-AP network may operate as leaf nodes in the multi-AP network.

In the example shown in FIG. 6, the Wireless Backhaul connections 604A, 604B carry data between the APs and may also be used for motion detection. Each of the wireless backhaul channels (or frequency bands) may be different than the channels (or frequency bands) used for serving the connected Wi-Fi devices.

In the example shown in FIG. 6, each of the wireless links 605A, 605B, 605C, 605D, 605E, 605F, 605G makes use of the frequency channel selected by the AP that the corresponding Wi-Fi device 605A, 605B, 605C, 605D, 605E, 605F, 605G is connected to. Each AP may select its own channel independently to serve the respective Wi-Fi devices, and the wireless links may be used for data communications as well as motion detection.

In some implementations, one or more of the APs in the wireless communication network has a wired internet connection 606. In the example shown in FIG. 6, the central AP 601 is connected to the wired internet connection 606, which extends internet connectivity to the home network. As such, internet bound traffic from devices connected to an AP without a Wired Internet Connection (extension APs 602A, 602B) are carried on a respective Wireless Backhaul connection (604A or 604B) to a device with a Wired Internet Connection.

Figure 7A:
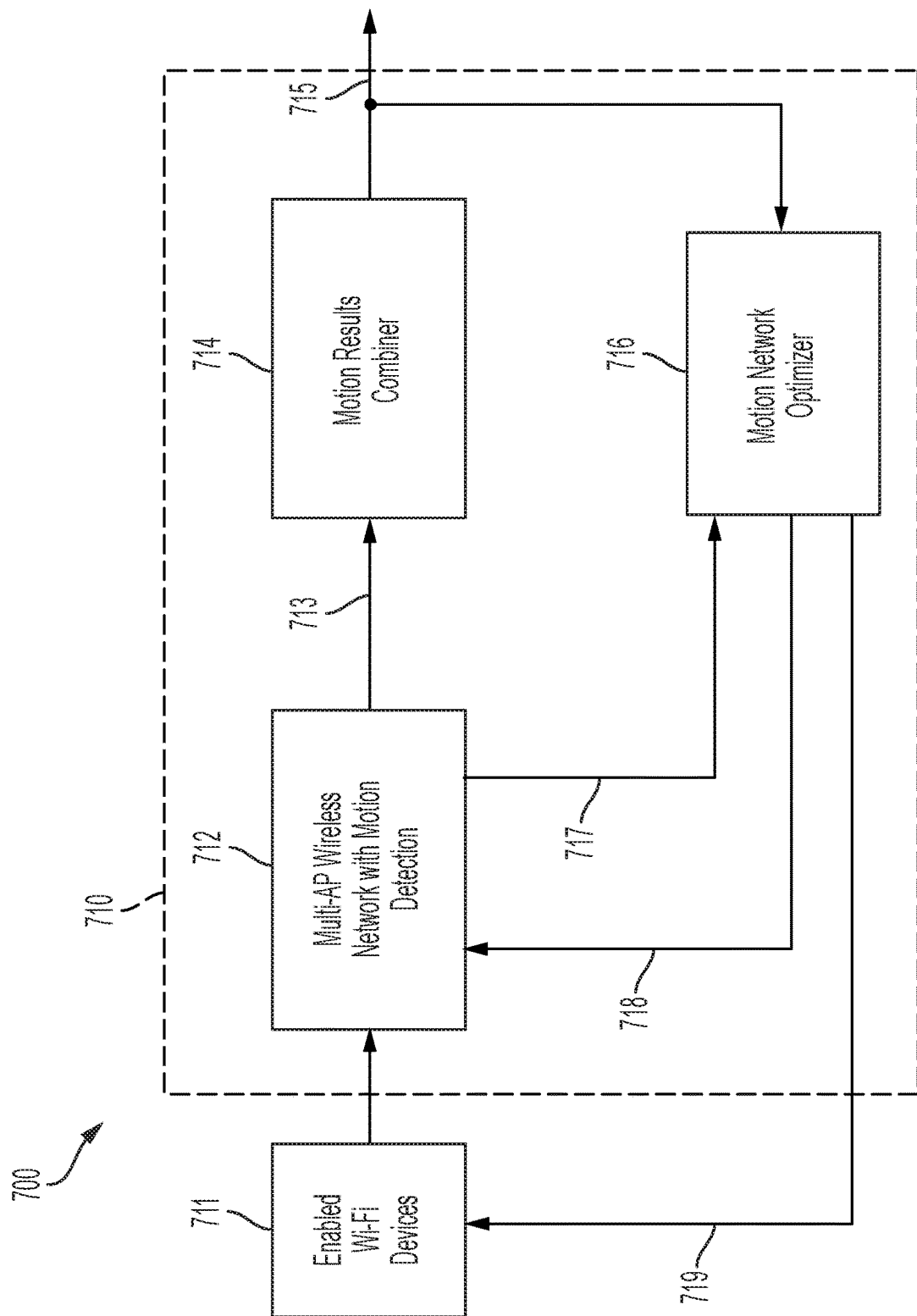
FIG. 7A is a block diagram showing aspects of an example motion detection system.

FIG. 7A is a block diagram showing aspects of an example motion detection system 700. The motion detection system 700 shown in FIG. 7A may be used in connection with the multi-AP home network shown in FIG. 6 or another type of wireless communication network. As shown in FIG. 7A, the example motion detection system 700 includes one or more devices 710 that include various modules, which may be implemented, for instance, as software, hardware, firmware or a combinations thereof. In some cases, the modules deployed on the one or more devices 710 are used to implement a multi-AP Motion Control System that operates as a closed loop system.

In the example shown in FIG. 7A, the enabled Wi-Fi devices list 711 is a system input that includes a list of Wi-Fi devices enabled and participating in the Wi-Fi motion detection network. In this example, only these Wi-Fi nodes will be used (e.g., as bi-static radar transmitters) for motion detection operations. The list 711 may be initialized upon starting the motion detection system operation, and may be maintained by the Motion Network Optimizer 716, for example, using the information contained in control signal 719. As shown in FIG. 7A, the list 711 is fed into the Multi-AP Wireless Network with Motion Detection 712 to identify all nodes which are used to produce measurements.

In the example shown in FIG. 7A, the Multi-AP Wireless Network with Motion Detection 712 represents a wireless communication network that generates the wireless signals used for motion detection. For example, the Multi-AP Wireless Network with Motion Detection 712 may include some or all of the components shown in, and described with respect to, FIG. 6 (e.g., the APs 601, 602A, 602B, the devices 603A, 603B, 603C, 603D, 603E, 603F, 603G, etc.).

In the example shown in FIG. 7A, the Motion Results Output 713 includes the output data produced by the motion detection algorithm. In a Multi-AP wireless network, each access point may run a motion detection algorithm collecting motion input data, and producing motion output results. The output may contain the motion results from each access point or each instance of a motion detection algorithm. The Motion Results Output 713 from multiple access points or other devices can be provided to a central location (e.g., the motion results combiner 714) so that the combined motion data can be processed. For example, in some cases, motion can be localized and summarized to the entire area covered by the Multi-AP network, or motion detection output data can be provided to a user interface, etc.

In the example shown in FIG. 7A, the Motion Results Combiner 714 receives the motion detection algorithm output data from the Multi-AP Wireless Network with Motion Detection 712 module. The example Motion Results Combiner 714 is a central computational module where all motion results (e.g., from each active motion detection algorithm) are combined, summarized, and output in a Motion Summary Report 715. In a Multi-AP network, the Motion Results Combiner 714 may be deployed on the Central AP (e.g., the Central AP 601 shown in FIG. 6) or another AP having a Wired Internet Connection.

In the example shown in FIG. 7A, the Motion Summary Report 715 is the output report produced by the Motion Results Combiner 714. The Motion Summary Report 715 may include an accumulation summary of all detected and localized motion from each active motion detection algorithm distributed throughout a Multi-AP network. As shown in FIG. 7A, the Motion Summary Report 715 is also used as a feedback signal for optimizing the motion network, and is passed into the Motion Network Optimizer 716 for this purpose.

In the example shown in FIG. 7A, the Motion Network Optimizer 716 analyzes the Motion Summary Report 715 and network topology information 717. The network topology information 717 indicates available APs, active channels, connected devices, and potentially other information about the topology of the Multi-AP Network. Given those inputs, the Motion Network Optimizer 716 produces outputs that include a steering optimization signal 718 and a device enable signal 719.

In some implementations, for every band steering or client steering optimization performed by the Motion Network Optimizer 716, a control signal 718 is asserted to the Multi-AP Wireless network to change a Wi-Fi device (e.g., one of the devices 603A, 603B, 603C, 603D, 603E, 603F, 603G shown in FIG. 6) to a connection with a different AP or a connection over a different frequency band. In addition, if the Motion Network Optimizer 716 determines to enable or disable a Wi-Fi Device from the motion network, a control signal 719 will be asserted to the Enabled Wi-Fi Device list 711. In some cases, the Motion Network Optimizer 716 performs the process 750 shown in FIG. 7B or another type of process to optimize or otherwise improve system utilization.

In the example shown in FIG. 7A, the Network Topology Information 717 is a signal that provides information regarding the current wireless network topology, such as number of APs (e.g. central APs, extension APs, etc.), which channels and frequency bands are being used, which devices are connected to which AP, and possibly other information.

In the example shown in FIG. 7A, the Steering Optimization Signal 718 is a control signal that may be asserted to the Multi-AP Wireless Network 712 to indicate band or client steering optimization requests from the Motion Network Optimizer 716.

In the example shown in FIG. 7A, the Device Enable Signal 719 is a control signal that may be asserted to update the Enabled Wi-Fi Device list 711 with any optimization requests from the Motion Network Optimizer 716. In some implementations, the Device Enable Signal 719 updates the Enabled Wi-Fi Device list 711 by changing a designation of one or more devices included in the list 711. For example, the Device Enable Signal 719 may designate a Wi-Fi device as being disabled from participating in motion detection (e.g., when motion detection output data indicates that motion is absent at its corresponding AP) or may designate a Wi-Fi device as being enabled to participate in motion detection (e.g., when motion detection output data indicates that motion is present at its corresponding AP).

Figure 7B:
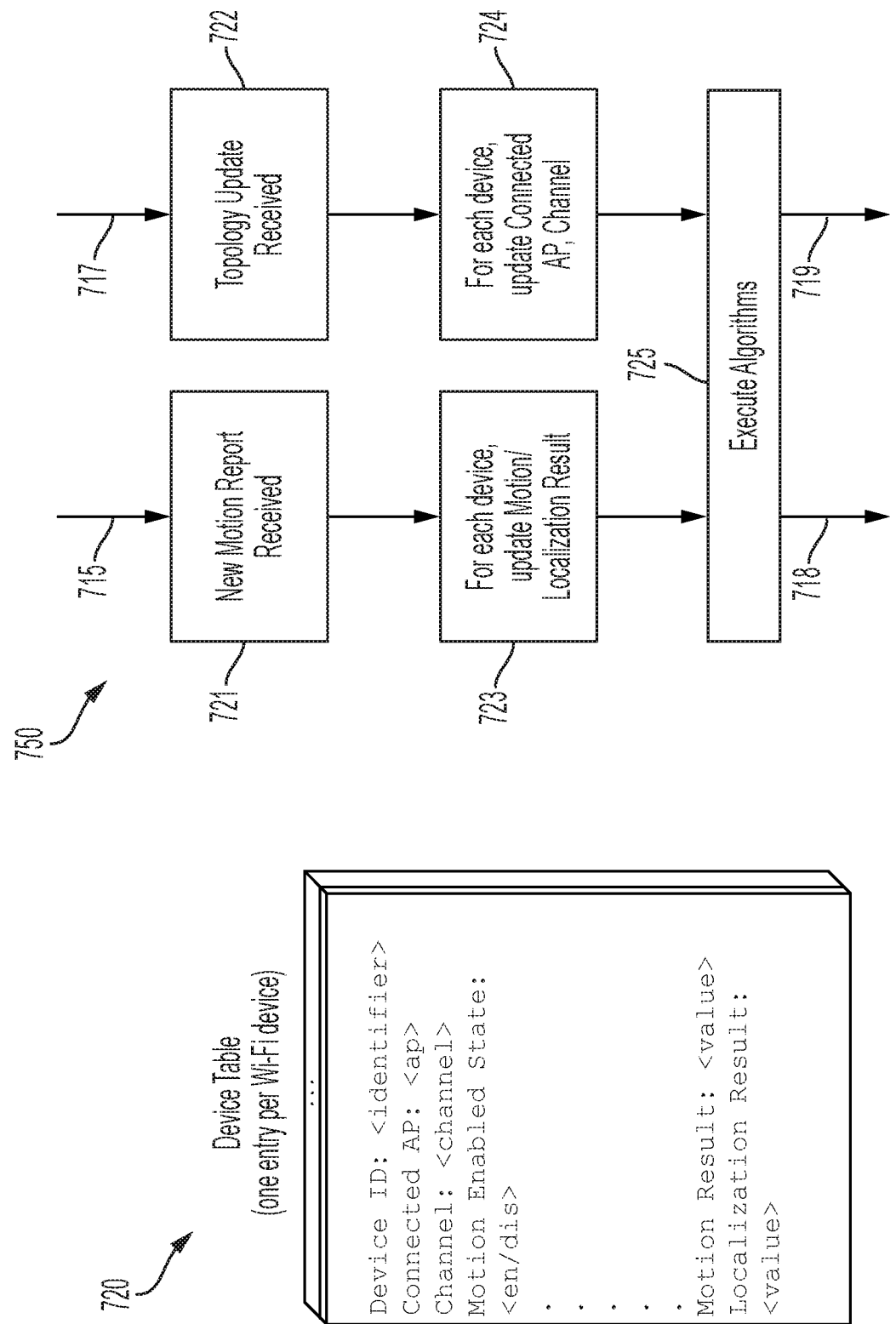
FIG. 7B is a flow diagram showing an example process performed by a motion detection system.

FIG. 7B is a flow diagram showing an example process 750 performed by a motion detection system. For example, the process 750 may be performed by the example Motion Network Optimizer 716 shown in FIG. 7A or by another type of component in a motion detection system.

In the example shown in FIG. 7B, a device table 720 includes a table entry for each Wi-Fi device in the Multi-AP network. The device table 720 can include a collection of information obtained from the Motion Reports 715 and Network Topology Information 717 represented in FIG. 7A. For example, upon receiving updates, the Motion Network Optimizer 716 may organize this information into a table or data structure that contains a list of elements for each device. The information from the Device Table 720 may at 725 (e.g., by an Optimization Algorithm) to suggest optimizations or improvements or other types of modifications.

As shown in FIG. 7B, at 721, a new motion report is received via the signal 715 from the motion results combiner 714 shown in FIG. 7A; and at 722, a topology update is received via the signal 717 from the multi-AP wireless network with motion detection 712 shown in FIG. 7A. At 723, the motion/localization results are updated for each device; and at 724 the connected AP and channel is updated for each device. At 725, one or more algorithms are executed based on the updated motion/localization results and the updated AP/channel information.

In the example shown in FIG. 7B, the algorithms executed at 725 may include one or more optimization algorithms that operate toward optimizing some aspect of the motion detection system. Various algorithms may be used here based on the use case. In some examples, one or more algorithms executed at 725 band steers devices and/or client steers devices, for instance, to balance motion enabled devices among APs. Such algorithms may provide improved coverage by having motion enabled devices on all APs. In some examples, one or more algorithms executed at 725 attempts to client steer silent devices toward each AP where motion was detected. Such algorithms may improve sensitivity and localization by having multiple sensors for APs detecting motion. In some examples, one or more algorithms executed at 725 band-steers some devices to a different frequency band, for example, if more than a certain number of devices are detecting the same motion. Such algorithms may provide frequency diversity, wherein more information is obtained from different frequency bands. In some examples, one or more algorithms executed at 725 enables or disables certain selected Wi-Fi devices based on motion presence for resource minimization. Such algorithms may provide coarse and fine grades of motion detection. For example, when no motion is detected, the system may enable only 1 or 2 devices per AP; whereas when motion is detected, a higher number of devices may be enabled and steered to an AP.

Figure 8:
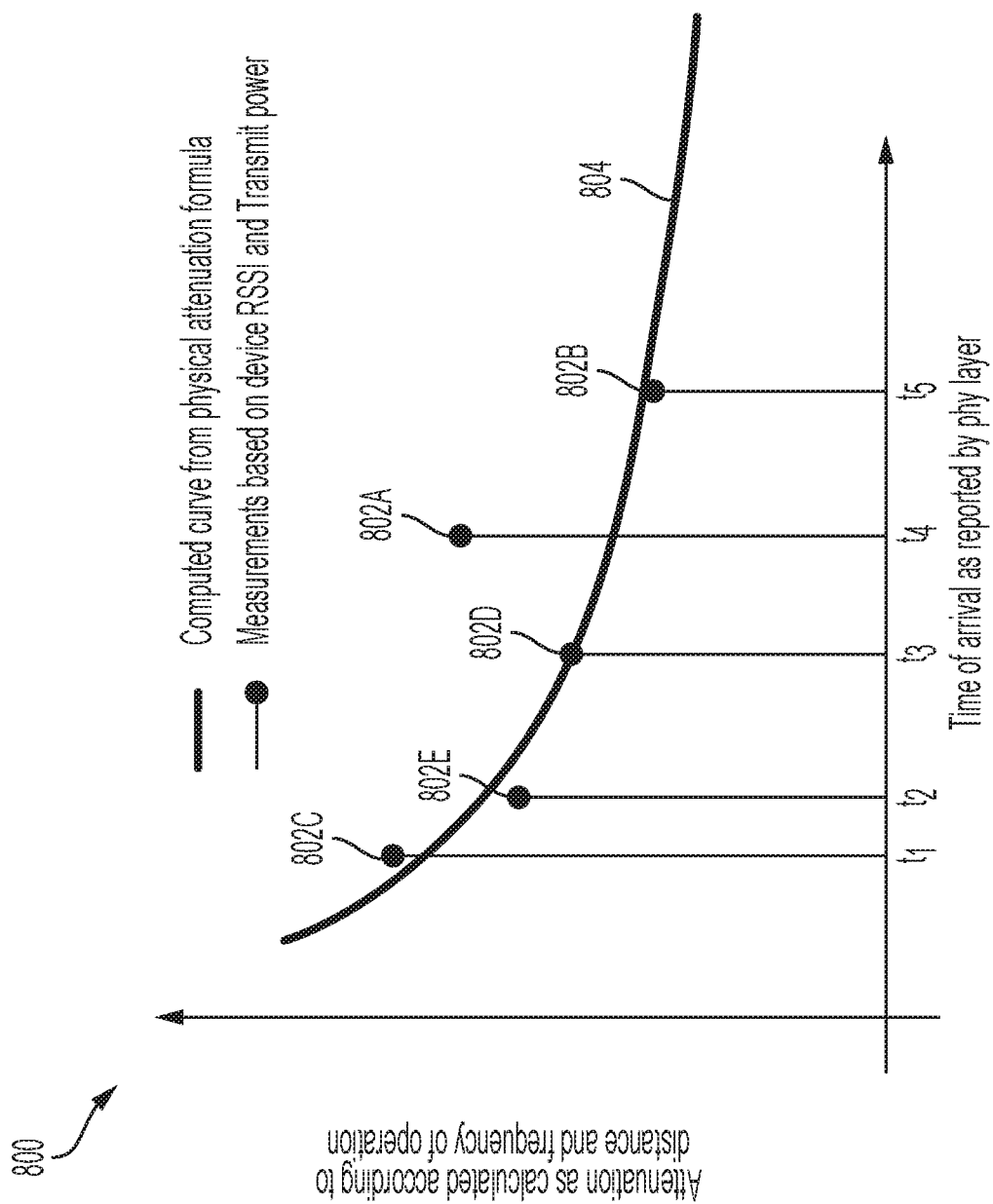
FIG. 8 shows an example of attenuations experienced, at an access point, by wireless signals transmitted by Wi-Fi devices.

As described above, the one or more algorithms executed at 725 may client steer devices such that certain Wi-Fi devices are enabled for motion detection while other Wi-Fi devices are disabled for motion detection. Client steering may be based, at least in part, on the attenuation experienced by a wireless signal that is transmitted from a first wireless communication device (e.g., the Wi-Fi devices 603) and received at a second wireless communication device (e.g., the respective APs 601, 602). As an example, a wireless signal (e.g., a ping) may be transmitted by each of the Wi-Fi devices 603A, 603B, 603C, 603D, 603E and received at the AP 602A. The AP 602A may execute the process 750 and may subsequently enable one or more of the Wi-Fi devices 603A, 603B, 603C, 603D, 603E for motion detection based on the attenuation experienced by the wireless signals (e.g., pings). FIG. 8 shows a plot 800 illustrating an example of attenuations 802A, 802B, 802C, 802D, 802E experienced, at the AP 602A, by a wireless signal (e.g., a ping) transmitted by the Wi-Fi devices 603A, 603B, 603C, 603D, 603E, respectively. The attenuations 802A, 802B, 802C, 802D, 802E may be indicative of a loss in signal power on the respective wireless links 605A, 605B, 605C, 605D, 605E shown in FIG. 6. In some implementations, the attenuations 802A, 802B, 802C, 802D, 802E may be computed based on a difference between the transmitted signal power and the received signal power (e.g., as indicated by a Receive-Signal-Strength-Indicator (RSSI)). The different Wi-Fi devices 603A, 603B, 603C, 603D, 603E are located at different distances from the AP 602A; therefore, each attenuation 802A, 802B, 802C, 802D, 802E may correspond to a respective time of arrival t4, t5, t1, t3, t2. The respective distances of the Wi-Fi devices 603A, 603B, 603C, 603D, 603E (and therefore, the respective times of arrival) may be reported to the AP 602A through the PHY layer of the wireless signal received at the AP 602A (e.g., as in some Wi-Fi standards, cellular network standards, or other protocols). Plot 800 also shows an attenuation curve 804 computed using a physical attenuation formula for radio waves. In some implementations, the physical attenuation formula predicts a signal's attenuation as a function of the frequency of operation and distance (and therefore, times of arrival).

In some implementations, if the attenuation 802A, 802B, 802C, 802D, 802E is substantially equal to the attenuation predicted at the respective times of arrival t4, t5, t1, t3, t2 (e.g., as indicated by the attenuation curve 804), then it may be inferred that the respective Wi-Fi device 603A, 603B, 603C, 603D, 603E is accurately reporting its distance to the AP 602A (e.g., through the PHY layer of the wireless signal received at the AP 602A), and such Wi-Fi devices may be enabled for motion detection. On the other hand, if the attenuation 802A, 802B, 802C, 802D, 802E is not substantially equal to the attenuation predicted at the respective times of arrival t4, t5, t1, t3, t2 (e.g., as indicated by the attenuation curve 804), then it may be inferred that the respective Wi-Fi device 603A, 603B, 603C, 603D, 603E is not accurately reporting its distance to the AP 602A (e.g., due to multiple signal paths present in the channel), and such Wi-Fi devices may be disabled for motion detection. As an illustration, in plot 800, the attenuations 802B, 802C, 802D, 802E are substantially equal to the attenuation curve 804 at the respective times of arrival t5, t1, t3, t2. Therefore, Wi-Fi devices 603B, 603C, 603D, 603E may be enabled for motion detection, thereby optimizing or enhancing system coverage (e.g. to cover the whole perimeter for motion detection or extend coverage of the system to the entire house/monitoring area). On the other hand, the attenuation 802A is not substantially equal to the attenuation curve 804 at the time of arrival t4. Consequently, Wi-Fi device 603A may be disabled for motion detection and regarded as not being suitable for optimizing or enhancing system coverage.

Figure 9:
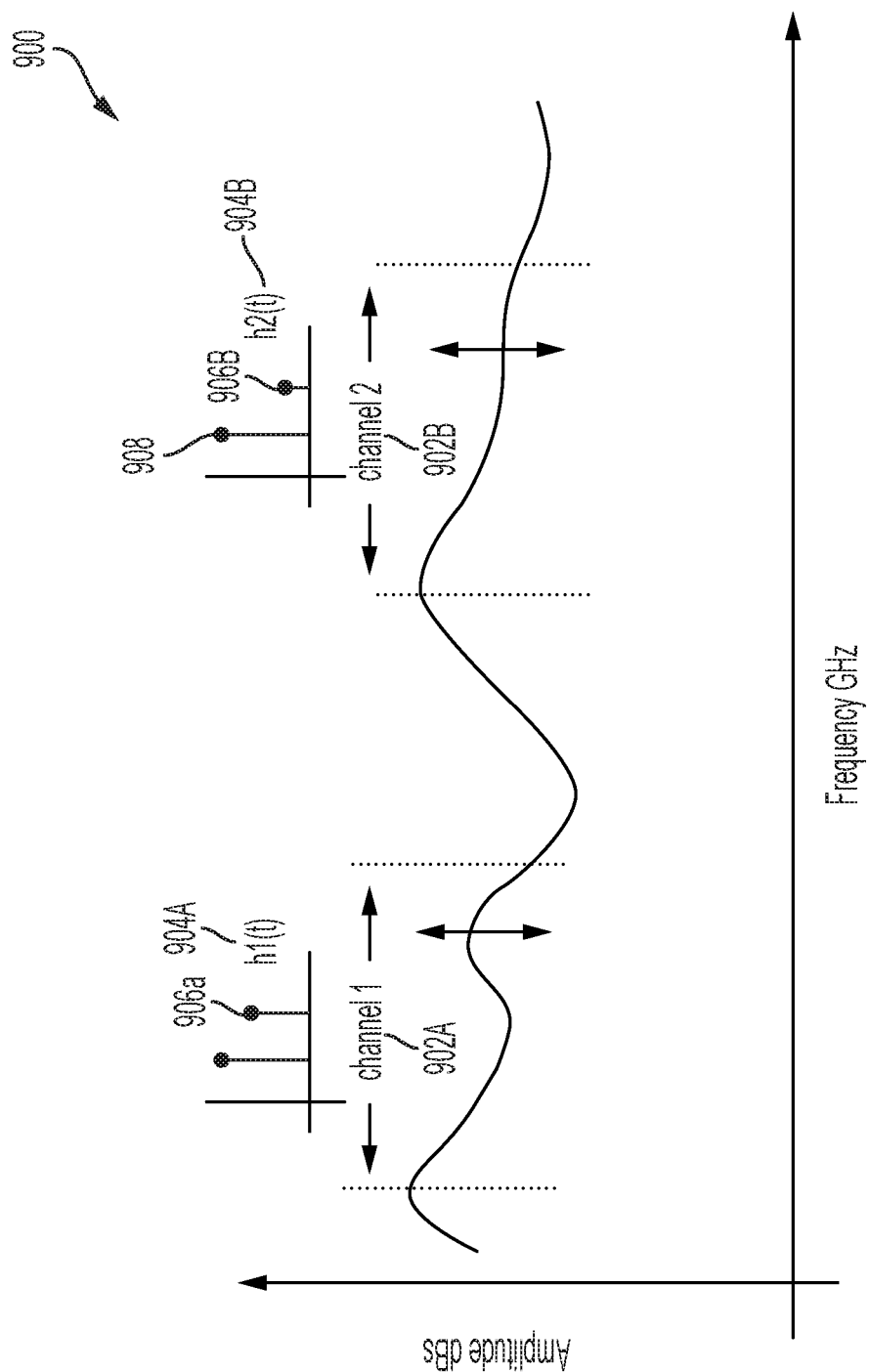
FIG. 9 shows an example of a channel response having a first channel and a second channel occupying different frequency bands.

As described above, the one or more algorithms executed at 725 may band steer devices such that certain frequency bands are enabled for motion detection while other frequency bands are disabled for motion detection. As an example, different channels in a wireless network (e.g., a Wi-Fi network) operate on different frequencies. Therefore, different signal paths may be delayed by different attenuations based on the channel's frequency of operation. In implementations where motion detection is used to sense the widest possible area, then the channels having several signal paths may be enabled for motion detection (e.g., to obtain coverage enhancement). On the other hand, in implementations where localization (e.g., location at which motion is detected) is of interest, then a channel having a minimal number of signal paths may be enabled for motion detection (e.g., to keep the disturbances focused within a narrow zone). FIG. 9 shows an example of a channel response 900 having a first channel 902A and a second channel 902B occupying different frequency bands. Each channel 902 corresponds to a respective time reflection profile 904 (which may also be referred to as a delay spread). For example, the first channel 902A corresponds to a first delay spread 904A, while the second channel 902B corresponds to a second delay spread 904B. Each delay spread 904 has two pulses, as demonstrated by the general shape of the channel response 900. For example, the channel response 900 shows a low-frequency sinusoid showing a general decrease in amplitude and a high-frequency sinusoid riding on top of the low-frequency sinusoid. The first channel 902A has higher spatial coverage and higher spatial sensitivity compared to the second channel 902B because the second pulse 906A in the first delay spread 904A has a larger amplitude than the second pulse 906B in the second delay spread 904B. The second channel 902B, on the other hand, has a more focused spatial coverage and higher localization accuracy compared to the first channel 902A (e.g., due to the presence of one main pulse 908 in the second delay spread 904B). Therefore, the one or more algorithms executed at 725 may determine which channel is best suited to its purpose based on these channel measurements and enable certain frequency for motion detection while disabling other frequency bands for motion detection.

In some implementations of the example systems and techniques shown and described with respect to FIGS. 6, 7A and 7B, 8, and 9 a motion detection system selects attributes of the wireless communication links that are used for motion detection. In some implementations, the motion detection system selects which nodes are connected in the network (e.g., selecting which AP each leaf node is connected to in a multi-AP wireless network). For example, changing which nodes in a network are connected to each other can improve the physical (spatial) coverage of the wireless signals and thereby improve the spatial coverage of the motion detection system. In some implementations, the motion detection system selects a frequency band used for wireless communication between a pair of nodes in a network (e.g., selecting 5 GHz or 2.4 GHz in a Wi-Fi network). For example, changing the frequency of the wireless signals used for motion detection may enhance propagation of the wireless signals through physical barriers and thereby improve the spatial coverage of the motion detection system. For instance, 2.4 GHz signals may propagate better through concrete than 5.0 GHz signals. Other frequency bands that may be used include 3 GHz, 6 GHz, 60 GHz, and others. In some implementations, the motion detection system selects a channel within a frequency band used for wireless communication between a pair of nodes in a network (e.g., selecting one of the available frequency or coded channels in a Wi-Fi network). For example, changing the channel of the wireless signals used for motion detection may reduce interference, enhance coverage, or provide other benefits.

In some instances, a wireless sensing system can allow wireless communication devices to dynamically indicate their willingness to participate in different sensing activities. The willingness of a device may be global or application specific (e.g., specific to security applications, energy management applications, healthcare applications, etc.). In some examples, a Wi-Fi device may communicate to the sensing system that it is unable or unwilling to participate in sensing related operations; or the Wi-Fi device may communicate to the sensing system that it is able or willing to participate in only healthcare sensing operations. In some instances, a Wi-Fi device may be operating in a low-power sleep mode and therefore be unwilling to participate in operations (e.g., channel illumination) that would require the Wi-Fi device to exit the sleep mode. However, for critical applications such as healthcare, a device may be willing to participate. As another example, a wireless communication device may indicate that it is willing to participate in "Security" applications (for instance, in which the motion detection system may activate an alarm when motion is detected), but not willing to participate in "Energy Management" applications (for instance, in which the motion detection system may power off lights or other devices when no motion is detected). As such, the device may indicate to the sensing system what kinds of applications the device may be used for.

To accommodate these and other scenarios, the sensing system may provide a mechanism by which the Wi-Fi device can indicate when it is available and/or when it is unavailable to participate in sensing system operations. Such a mechanism may provide benefits to the sensing system, for example, allowing a motion detection system to determine when it can depend on particular devices for participation in the motion detection system operation, and allowing the motion detection system to respect (and in some cases maximize) battery life of the connected devices, etc. Such a mechanism may also provide benefits for the participating devices, for example, allowing them to opt out of participating at certain times, allowing them to provide a positive user experience while still offering the ability to participate in motion detection when appropriate, etc. By allowing an application specific participation indicator, a device may further select which sensing applications it will participate in.

In some implementations, wireless communication devices that connect as nodes to a mesh network (e.g., cellphones, laptops, etc.) operate on battery power, without or without support from an external power source (e.g., charger) during different time periods. These and other types of wireless communication devices may define triggers to transition between participating and not participating in a motion detection system, as participating would generally consume some of the wireless communication device's resources (e.g., energy, bandwidth, processor time, etc.). The triggers can be defined to control the conditions under which, and the extent to which, the wireless communication device's resources will be available for motion detection system operations.

Figure 10A:
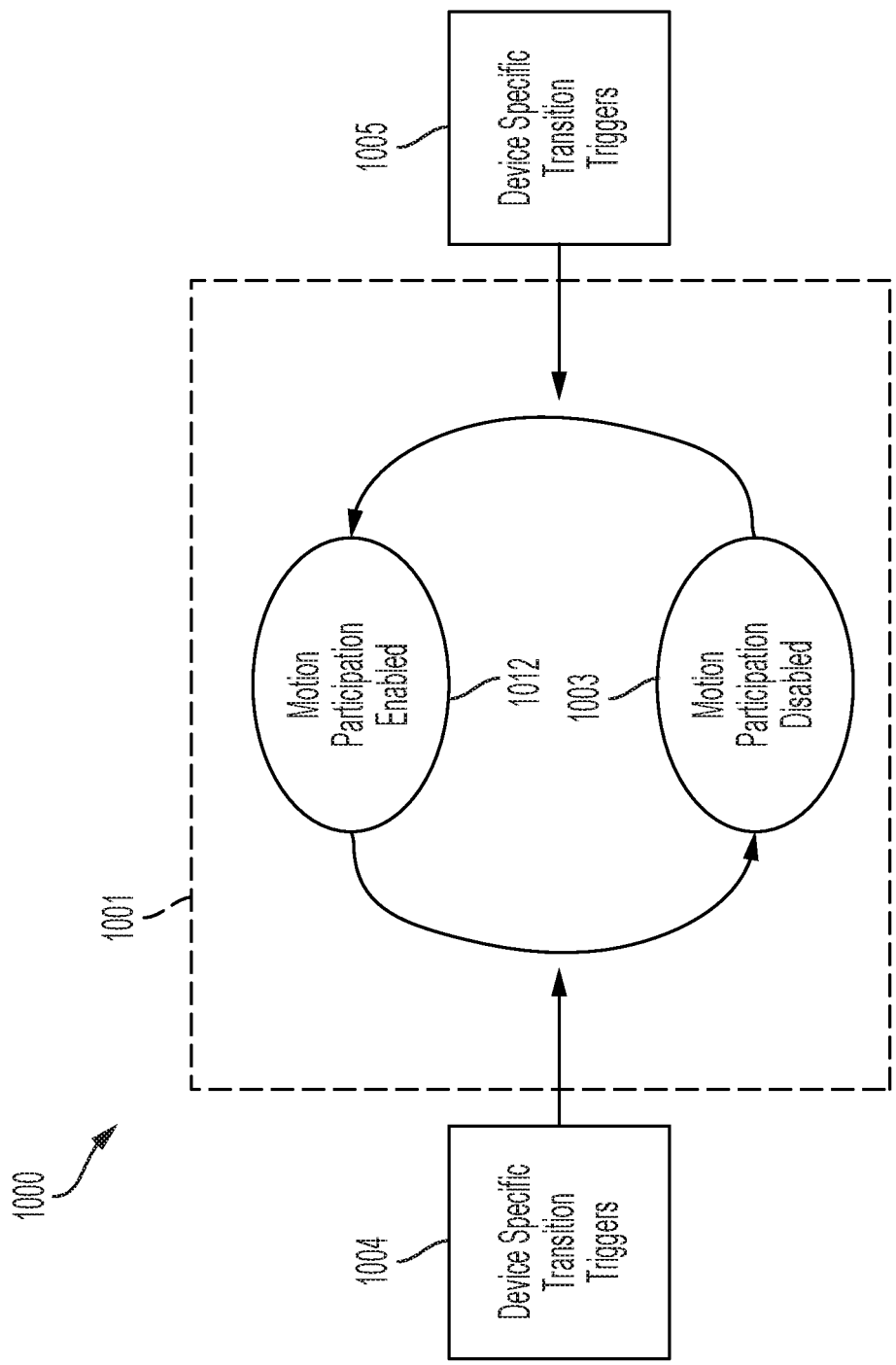
FIG. 10A is a block diagram showing aspects of an example motion detection system.

FIG. 10A is a block diagram showing aspects of an example motion detection system 1000. The example motion detection system 1000 represented in FIG. 10A may be used in connection with the multi-AP home network shown in FIG. 6 or another type of wireless communication network.

In the example shown in FIG. 10A, Device States 1001 of a wireless communication device (e.g., a node in a mesh network) include a Motion Participation Enabled state 1002 and a Motion Participation Disabled state 1003. In the example shown in FIG. 10A, based on a wireless communication device's current availability, it will be in one of the two states. Other states may be defined in some implementations. Transitions between states may be triggered by various types of events such as the Device Specific Transition Triggers 1004, 1005 shown in FIG. 10A.

In the example shown in FIG. 10A, in the Motion Participation Enabled state 1002, the wireless communication device is capable and willing to participate in a motion detection network (e.g., upon request by a controller of the motion detection system). For instance, in the Motion Participation Enabled state 1002, the wireless communication device may receive an instruction (e.g., a signal from the node measurement mechanism 305 in FIG. 3) to transmit or illuminate a channel, and the wireless communication device may cooperate with the instruction by sending a wireless transmission or signal to illuminate the channel.

In the example shown in FIG. 10A, in the Motion Participation Disabled state 1003, the wireless communication device is unwilling to participate in the motion detection network (e.g., if requested by a controller of the motion detection system). For instance, in the Motion Participation Enabled state 1002, the wireless communication device may not receive or may not cooperate with instructions (e.g., from the node measurement mechanism 305 in FIG. 3) to transmit or illuminate a channel.

In the example shown in FIG. 10A, the Device Specific Transition Trigger 1004 represents conditions that cause the wireless communication device to transition from the Motion Participation Enabled state 1002 to the Motion Participation Disabled state 1003. In some implementations, the conditions are open to the device manufacturer or the user to define or configure. An example of a Device Specific Transition Trigger 1004 is when a mobile device is disconnected from its battery charger. Other types of events or conditions may be used as triggers.

In the example shown in FIG. 10A, the Device Specific Transition Trigger 1005 represents conditions that cause the wireless communication device to transition from the Motion Participation Disabled state 1003 to the Motion Participation Enabled state 1002. In some implementations, the conditions are open to the device manufacturer or the user to define or configure. An example of a Device Specific Transition Trigger 1005 is when a mobile device is plugged into its battery charger. Other types of events or conditions may be used as triggers.

Figure 10B:
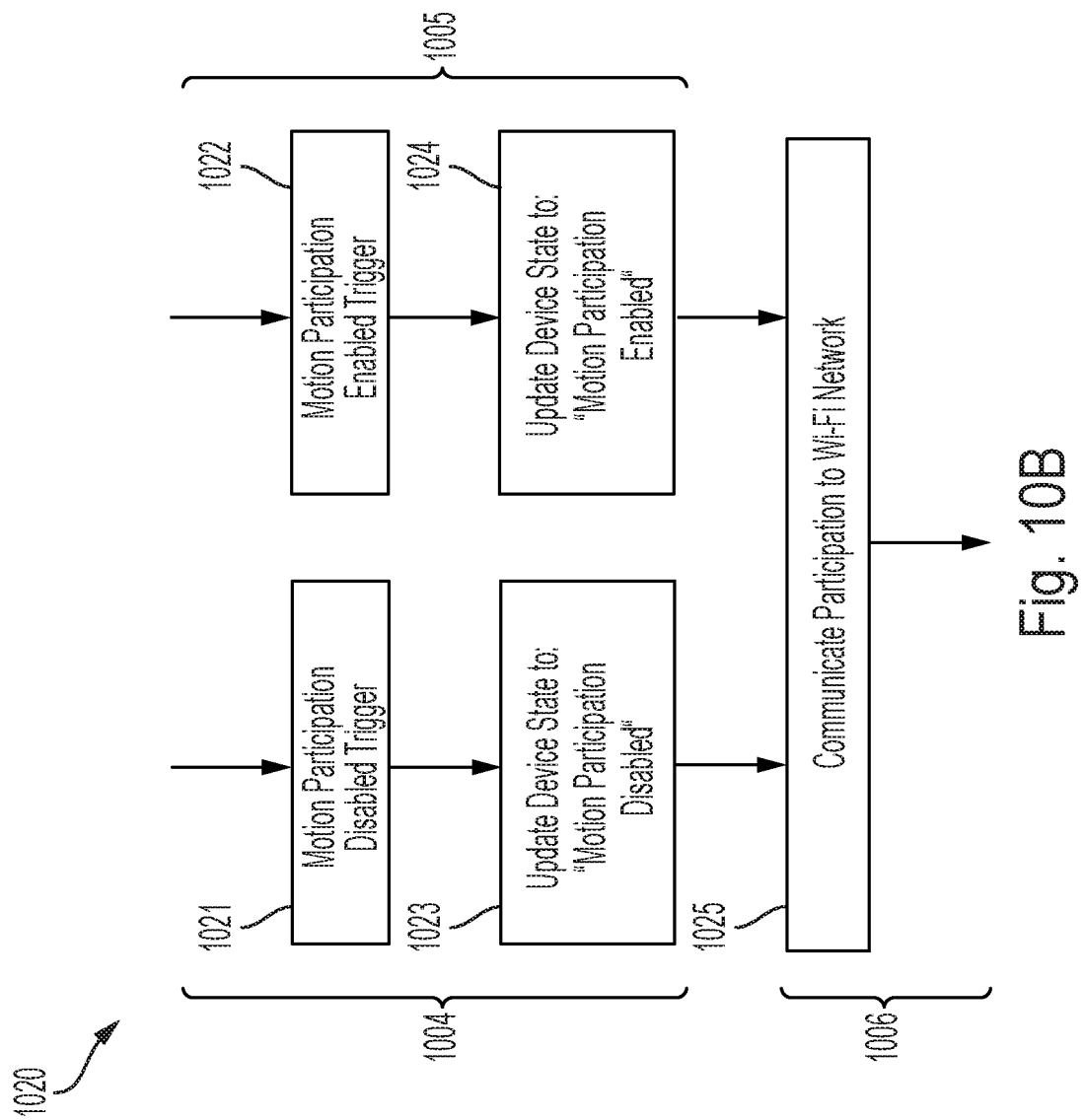
FIG. 10B is a flow diagram showing an example process performed by a wireless communication device.

FIG. 10B is a flow diagram showing an example process 1020 performed by a wireless communication device. The example process 1020 represented in FIG. 10B may be performed by a wireless communication device that is connected to a wireless communication network (e.g., a leaf node in the multi-AP home network shown in FIG. 6 or otherwise).

At 1021 a motion participation disabled trigger (e.g., an event or condition) is detected; and at 1023, the device's state is updated to the Motion Participation Disabled state. Operations 1021, 1023 in FIG. 10B may coincide with the Device Specific Transition Triggers 1004 shown in FIG. 10A.

At 1022 a motion participation enabled trigger (e.g., an event or condition) is detected; and at 1024, the device's state is updated to the Motion Participation Enabled state. Operations 1022, 1024 in FIG. 10B may coincide with the Device Specific Transition Triggers 1005 shown in FIG. 10A.

At 1025, after a device state change occurs (at 1023 or 1024), the current state of the device is communicated to the motion detection system (e.g., a controller of the motion detection system) so that the device will be included or excluded from participation according to its current state. Thus, in some implementations, only changes in the device's state trigger a new communication of participation status at 1025. In some implementations, the device may be configured to communicate its participation status at other times. Various mechanisms may be used to communicate the participation status at 1025. For instance, any available communication options in a Wi-Fi standard may be used in some cases. Some examples include data transmission to a Wi-Fi Motion Controller (e.g., as shown in FIG. 11), encapsulation of state information in a Management Frame Information Element (i.e., Info-Element in Action-No-Ack frame), and possibly others.

Figure 11:
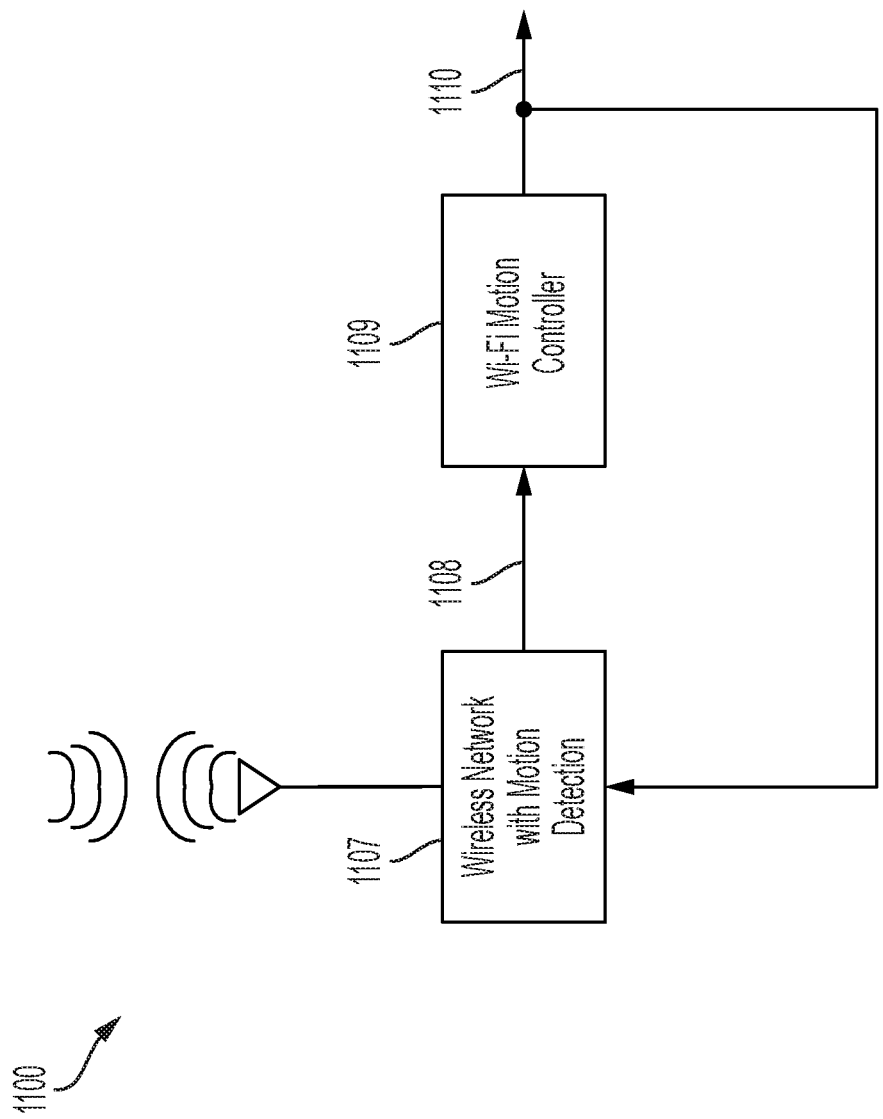
FIG. 11 is a block diagram showing aspects of an example motion detection system.

FIG. 11 is a block diagram showing aspects of an example motion detection system 1100. The motion detection system 1100 represented in FIG. 11 can receive participation status information from wireless communication devices, and modify operations according to which devices are willing and able to participate in motion detection operations.

Figure 12:
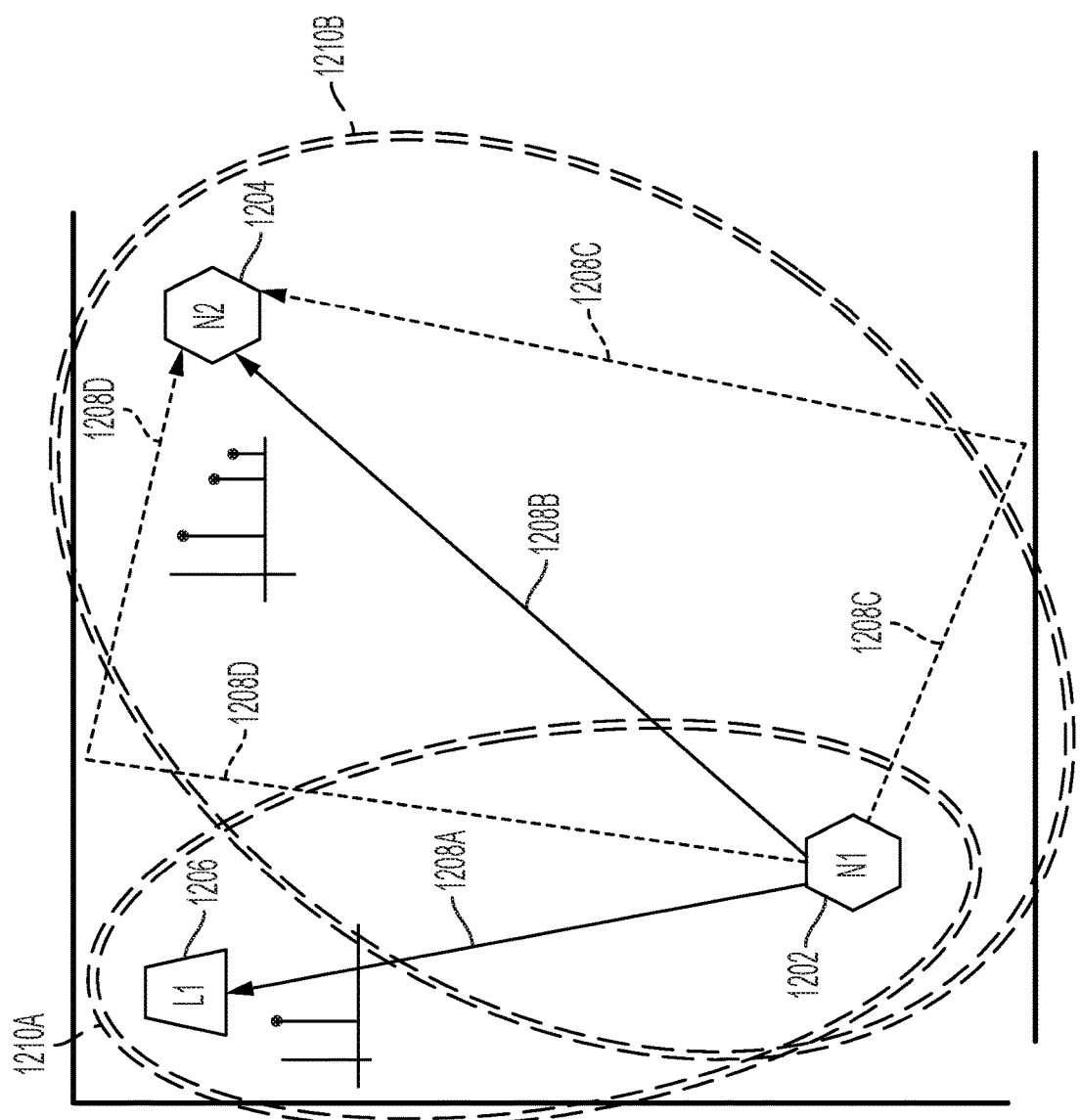
FIG. 12 is a diagram showing an example of a wireless communication system including access point nodes and a leaf node.

In the example shown in FIG. 11, the Wireless Network with Motion Detection 1107 represents a wireless communication network. The wireless communication network includes multiple wireless communication devices that communicate with each other wirelessly according to one or more standards or other types of protocols. The devices may include one or more AP nodes and one or more leaf nodes (e.g., as shown in the example of FIG. 12). Each of the wireless communication devices can communicate its current state information (e.g., an indication of a Motion Participation Enabled state or a Motion Participation Disabled state) to other devices, for example, as described with respect to 1025 in FIG. 10B. In some cases, the state information is communicated through a standard Wi-Fi communication mechanism (e.g., a field defined in a Wi-Fi specification). For example, the wireless communication devices may communicate their participation states to one or more AP nodes or another component of the wireless communication network, which can produce an output signal 1108 that provides the state information to the motion detection system.

In the example shown in FIG. 11, the Device Motion State update signal 1108 is an output signal generated by an AP that is managing the network connection to the wireless communication device. The signal 1108 indicates any updates in the device's motion participation state, and is passed to the Wi-Fi Motion Controller 1109.

In the example shown in FIG. 11, the Wi-Fi Motion Controller 1109 manages the configuration of the participating Wi-Fi devices. Accordingly, the Wi-Fi Motion Controller 1109 can receive motion participation state information from the wireless communication devices in the wireless communication network. The Wi-Fi Motion Controller 1109 can produce an output signal 1110 that indicates the Motion Participation State for each connected device. In some cases, the output signal 1110 is used to update a list of enabled devices in a motion detection system. For example, the output signal 1110 may be used to update the Enabled Wi-Fi Devices list 302 in FIG. 3, the Enabled Wi-Fi Devices list 711 in FIG. 7A, or another type of list. The output signal 1110 may be used in another manner in some cases.

As shown in FIG. 11, the Motion Participation State Signal 1110 is an output signal that indicates the Motion Participation State for each connected device, which may be fed back to the Wireless Network 1107 so the participation state can be implemented appropriately.

FIG. 12 illustrates an example where one or more wireless communication devices 1202, 1204, 1206 may indicate when it is available or when it is unavailable to participate in operations of a motion detection system. The example of FIG. 12 shows a first AP node 1202 that is connected to a leaf node 1206 by a direct signal path 1208A, and to a second AP node 1204 by a direct signal path 1208B. The first AP node 1202 is also connected to the second AP node 1204 by indirect (e.g., reflected) signal paths 1208C, 1208D. Consequently, the channel that connects the first AP node 1202 and the second AP node 1204 is a multipath channel. Therefore, the channel that connects the first AP node 1202 and the second AP node 1204 can sense motion in a larger area compared to the channel that connects the first AP node 1202 and the leaf node 1206. Consequently, the motion detection zone 1210B of the wireless communication link between the first AP node 1202 and the second AP node 1204 is greater compared to the motion detection zone 1210A of the wireless communication link between the first AP node 1202 and the leaf node 1206. In some implementations, if the second AP node 1204 and the leaf node 1206 report similar distances (e.g., based on times of arrival) to the first AP node 1206, the motion detection system may indicate the second AP node 1204 as having a wider coverage area for motion detection compared to the leaf node 1206. In some implementations, this would allow the motion detection system to maximize the area over which motion is sensed while minimizing the number of wireless communication devices used for sensing motion. In some implementations, the signal paths in a given wireless communication link can be extracted using frequency-domain channel information.

In some implementations of the example systems and techniques shown and described with respect to FIGS. 10A, 10B, 11, and 12 a motion detection system selects wireless communication links to use for motion detection based on participation state signals provided by wireless communication devices. For example, each wireless communication device in a wireless communication network may indicate its availability for motion detection operations and the motion detection system may dynamically listen for which devices to include in motion detection processes. In some cases, each device indicates its availability through the existing wireless network infrastructure. For example, an information element in a standard Wi-Fi signal can be used to indicate motion detection capabilities.

Figure 13:
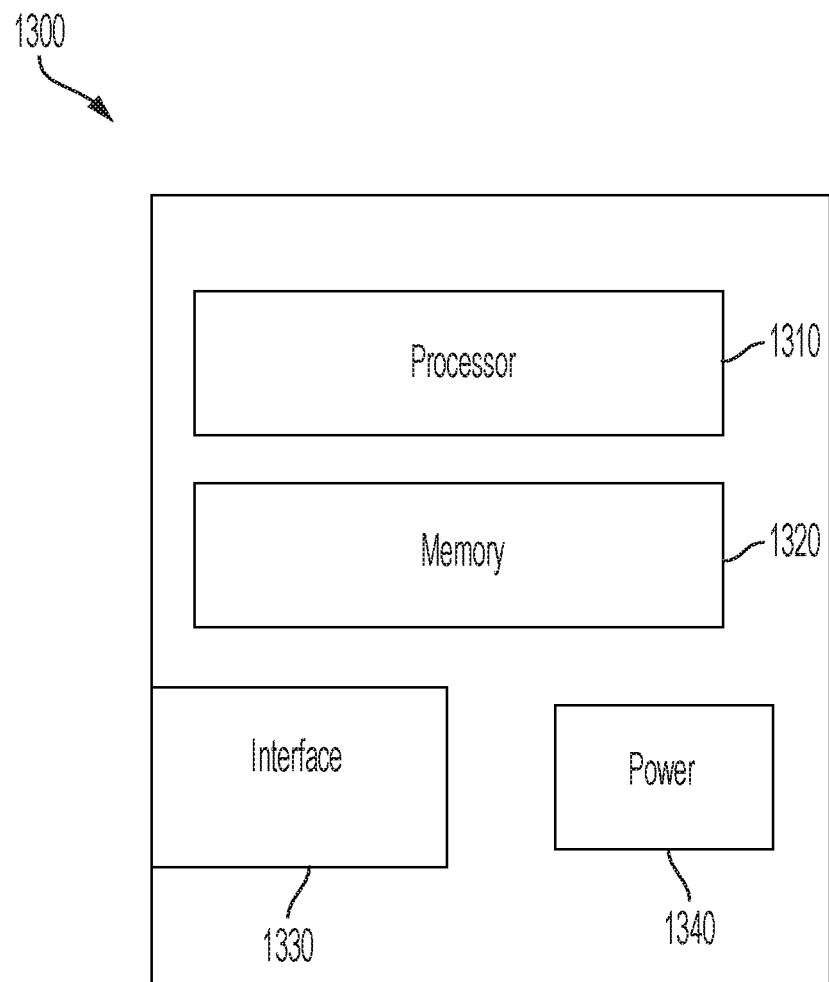
FIG. 13 is a block diagram showing an example wireless communication device.

FIG. 13 is a block diagram showing an example wireless communication device 1300. As shown in FIG. 13, the example wireless communication device 1300 includes an interface 1330, a processor 1310, a memory 1320, and a power unit 1340. A wireless communication device (e.g., any of the wireless communication devices 102A, 102B, 102C in FIG. 1) may include additional or different components, and the wireless communication device 1300 may be configured to operate as described with respect to the examples above. In some implementations, the interface 1330, processor 1310, memory 1320, and power unit 1340 of a wireless communication device are housed together in a common housing or other assembly. In some implementations, one or more of the components of a wireless communication device can be housed separately, for example, in a separate housing or other assembly.

The example interface 1330 can communicate (receive, transmit, or both) wireless signals. For example, the interface 1330 may be configured to communicate radio frequency (RF) signals formatted according to a wireless communication standard (e.g., Wi-Fi, 4G, 5G, Bluetooth, etc.). In some implementations, the example interface 1330 includes a radio subsystem and a baseband subsystem. The radio subsystem may include, for example, one or more antennas and radio frequency circuitry. The radio subsystem can be configured to communicate radio frequency wireless signals on the wireless communication channels. As an example, the radio subsystem may include a radio chip, an RF front end, and one or more antennas. The baseband subsystem may include, for example, digital electronics configured to process digital baseband data. In some cases, the baseband subsystem may include a digital signal processor (DSP) device or another type of processor device. In some cases, the baseband system includes digital processing logic to operate the radio subsystem, to communicate wireless network traffic through the radio subsystem or to perform other types of processes.

The example processor 1310 can execute instructions, for example, to generate output data based on data inputs. The instructions can include programs, codes, scripts, modules, or other types of data stored in memory 1320. Additionally or alternatively, the instructions can be encoded as pre-programmed or re-programmable logic circuits, logic gates, or other types of hardware or firmware components or modules. The processor 1310 may be or include a general-purpose microprocessor, as a specialized co-processor or another type of data processing apparatus. In some cases, the processor 1310 performs high level operation of the wireless communication device 1300. For example, the processor 1310 may be configured to execute or interpret software, scripts, programs, functions, executables, or other instructions stored in the memory 1320. In some implementations, the processor 1310 be included in the interface 1330 or another component of the wireless communication device 1300.

The example memory 1320 may include computer-readable storage media, for example, a volatile memory device, a non-volatile memory device, or both. The memory 1320 may include one or more read-only memory devices, random-access memory devices, buffer memory devices, or a combination of these and other types of memory devices. In some instances, one or more components of the memory can be integrated or otherwise associated with another component of the wireless communication device 1300. The memory 1320 may store instructions that are executable by the processor 1310. For example, the instructions may include instructions to perform one or more of the operations shown in or described with respect to any of FIGS. 2A-2B, 3, 4, 5A-5B, 6, 7A-7B, 8, 9, 10A-10B, 11, and 12.

The example power unit 1340 provides power to the other components of the wireless communication device 1300. For example, the other components may operate based on electrical power provided by the power unit 1340 through a voltage bus or other connection. In some implementations, the power unit 1340 includes a battery or a battery system, for example, a rechargeable battery. In some implementations, the power unit 1340 includes an adapter (e.g., an AC adapter) that receives an external power signal (from an external source) and coverts the external power signal to an internal power signal conditioned for a component of the wireless communication device 1300. The power unit 1320 may include other components or operate in another manner.

Figure 14:
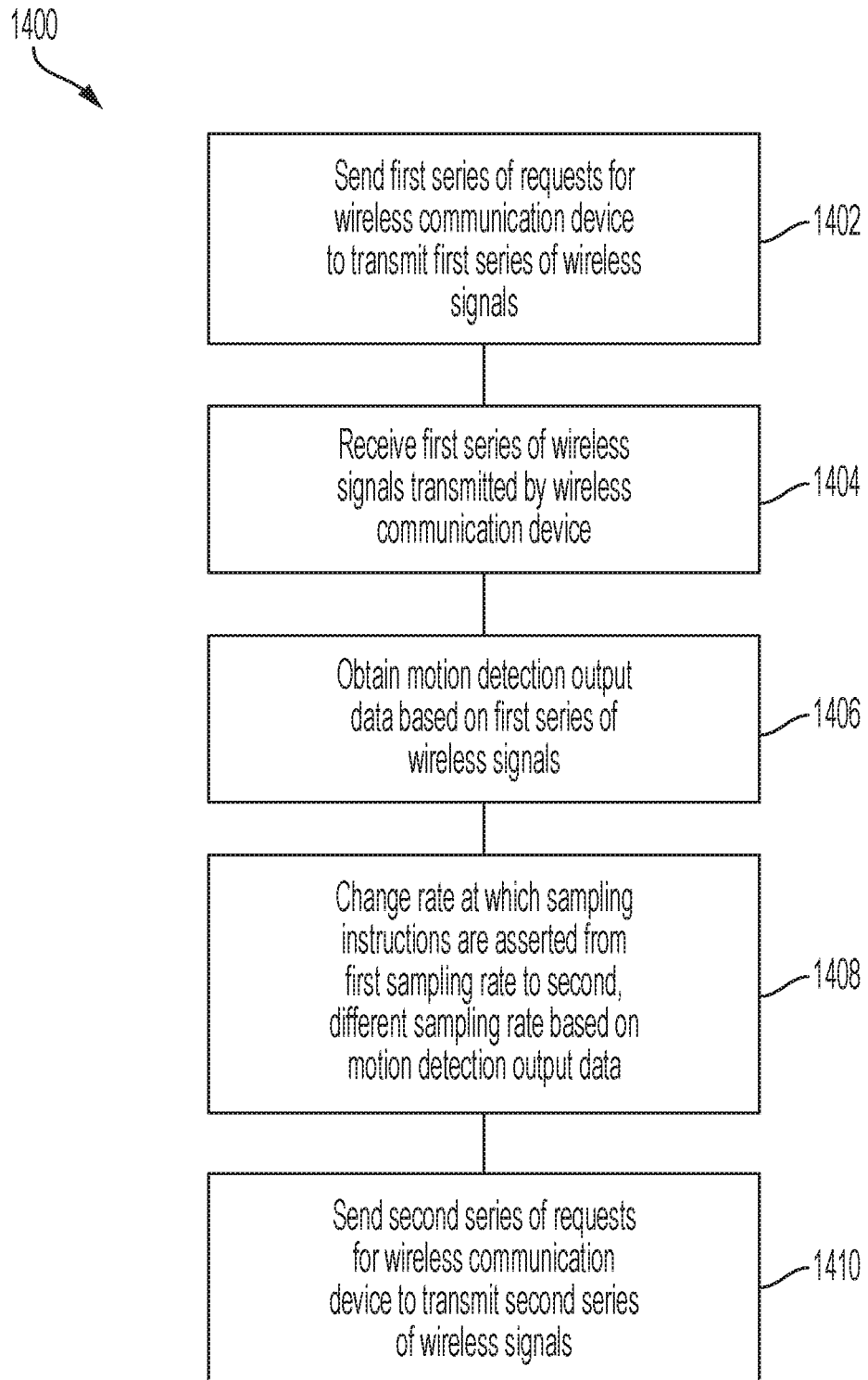
FIG. 14 is a flow diagram showing an example process performed by a motion detection system to control measurement rates in the motion detection system.

FIG. 14 is a flow diagram showing an example process 1400 performed by a motion detection system to control measurement rates in the motion detection system. Operation 1402 of process 1400 includes sending a first series of requests (e.g. triggers from Node Measurement Mechanism 305 in FIG. 3) for a wireless communication device to transmit a first series of wireless signals. The first series of requests can be sent in response to a first series of sampling instructions asserted at a first sampling rate (e.g., Node Measurement Scheduler Output Signal 304 in FIG. 3 asserted at the first sampling rate). Operation 1404 of process 1400 includes receiving the first series of wireless signals (e.g., via the RF interface 306 in FIG. 3) transmitted by the wireless communication device. The first series of wireless signals may be transmitted by the wireless communication device in response to the first series of requests (e.g., triggers from Node Measurement Mechanism 305 in FIG. 3). Operation 1406 of process 1400 includes obtaining motion detection output data (e.g. Motion Detection Algorithm Output 309 in FIG. 3) based on the first series of wireless signals. The motion detection output data can represent a degree of motion detected by the motion detection system based on the first series of wireless signals. The degree of motion may be expressed as a motion indicator value (MIV). Operation 1408 of process 1400 includes changing a rate at which sampling instructions are asserted from the first sampling rate to a second, different sampling rate based on the motion detection output data. In some implementations, operation 1408 may be executed by the Measurement Rate Controller 310. Changing the rate can include generating a rate control signal (e.g., measurement rate control signal 312 in FIG. 3) indicative of the second sampling rate. Operation 1410 of process 1400 includes sending a second series of requests (e.g. subsequent triggers from Node Measurement Mechanism 305 in FIG. 3) for the wireless communication device to transmit a second series of wireless signals. The second series of requests can be sent in response to a second series of sampling instructions asserted at the second sampling rate (e.g., Node Measurement Scheduler Output Signal 304 in FIG. 3 asserted at the second sampling rate).

Figure 15:
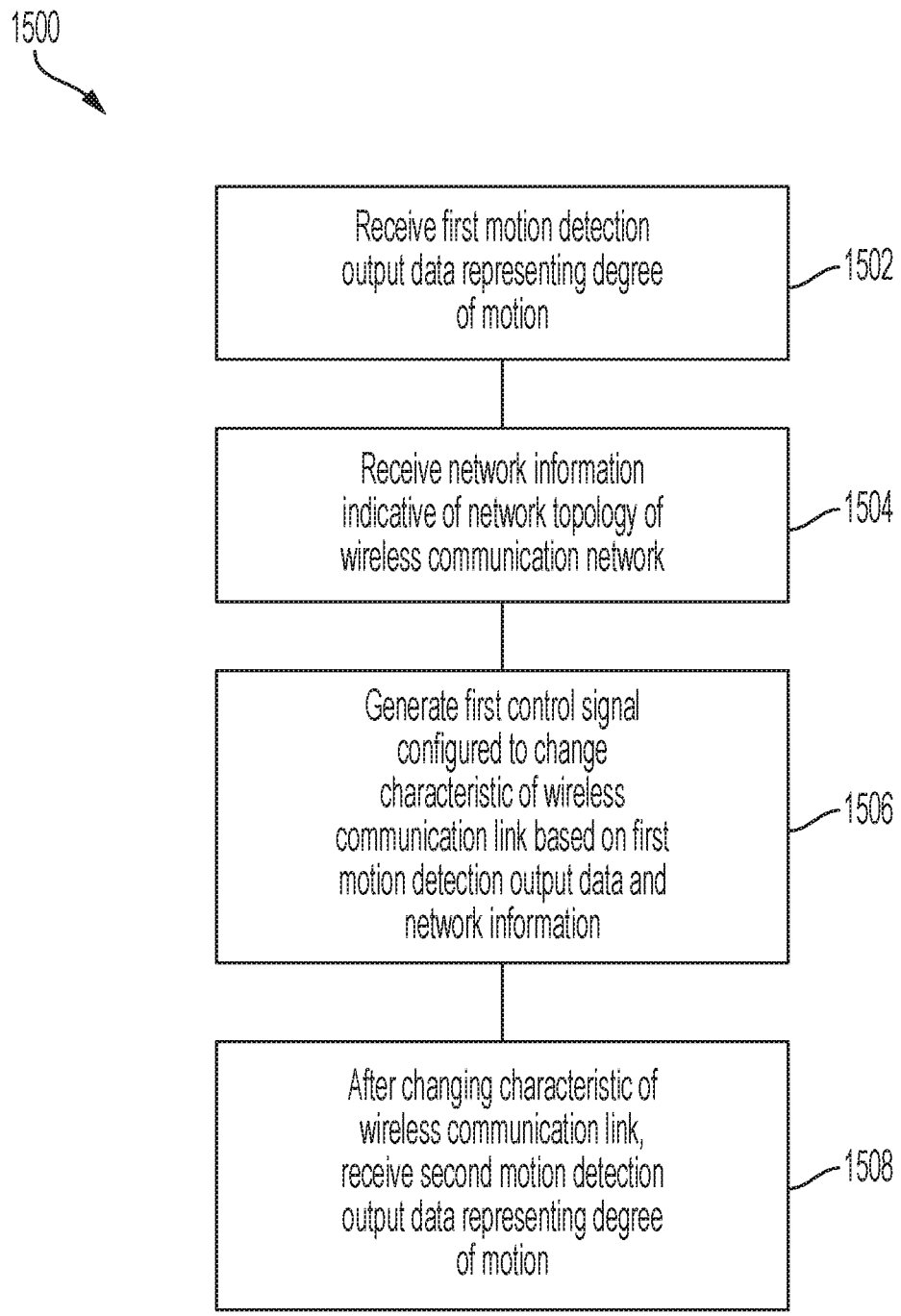
FIG. 15 is a flow diagram showing an example process performed by a motion detection system to control wireless connections in the motion detection system.

FIG. 15 is a flow diagram showing an example process 1500 performed by a motion detection system to control wireless connections in the motion detection system. Operation 1502 of process 1500 includes receiving first motion detection output data (e.g. data included in Motion Summary Report 715 in FIG. 7A) representing a degree of motion. The degree of motion can be detected by a motion detection system based on wireless signals exchanged in a wireless communication network (e.g. Multi-AP Wireless Network with Motion Detection 712 in FIG. 7A). In some implementations, the wireless communication network includes a first access point (e.g., one or more of the APs 601, 602A, 602B in FIG. 6) and a first client device (e.g. one or more of the devices 603A, 603B, 603C, 603D, 603E, 603F, 603G, etc. in FIG. 6) communicatively coupled by a first wireless communication link (e.g., respective wireless links 605A, 605B, 605C, 605D, 605E, 605F, 605G in FIG. 6). Operation 1504 of process 1500 includes receiving network information (e.g., network topology information 717 in FIG. 7A) indicative of a network topology of the wireless communication network. Operation 1506 of process 1500 includes generating a first control signal (e.g., Steering Optimization Signal 718 in FIG. 7A) configured to change a characteristic of the first wireless communication link based on the first motion detection output data (e.g. data included in Motion Summary Report 715 in FIG. 7A) and the network information (e.g., network topology information 717 in FIG. 7A). Operation 1508 of process 1500 includes, after changing the characteristic of the first wireless communication link, receiving second motion detection output data (e.g. data included in a subsequent Motion Summary Report 715) representing a degree of motion detected by the motion detection system based on wireless signals exchanged in the wireless communication network.

Figure 16:
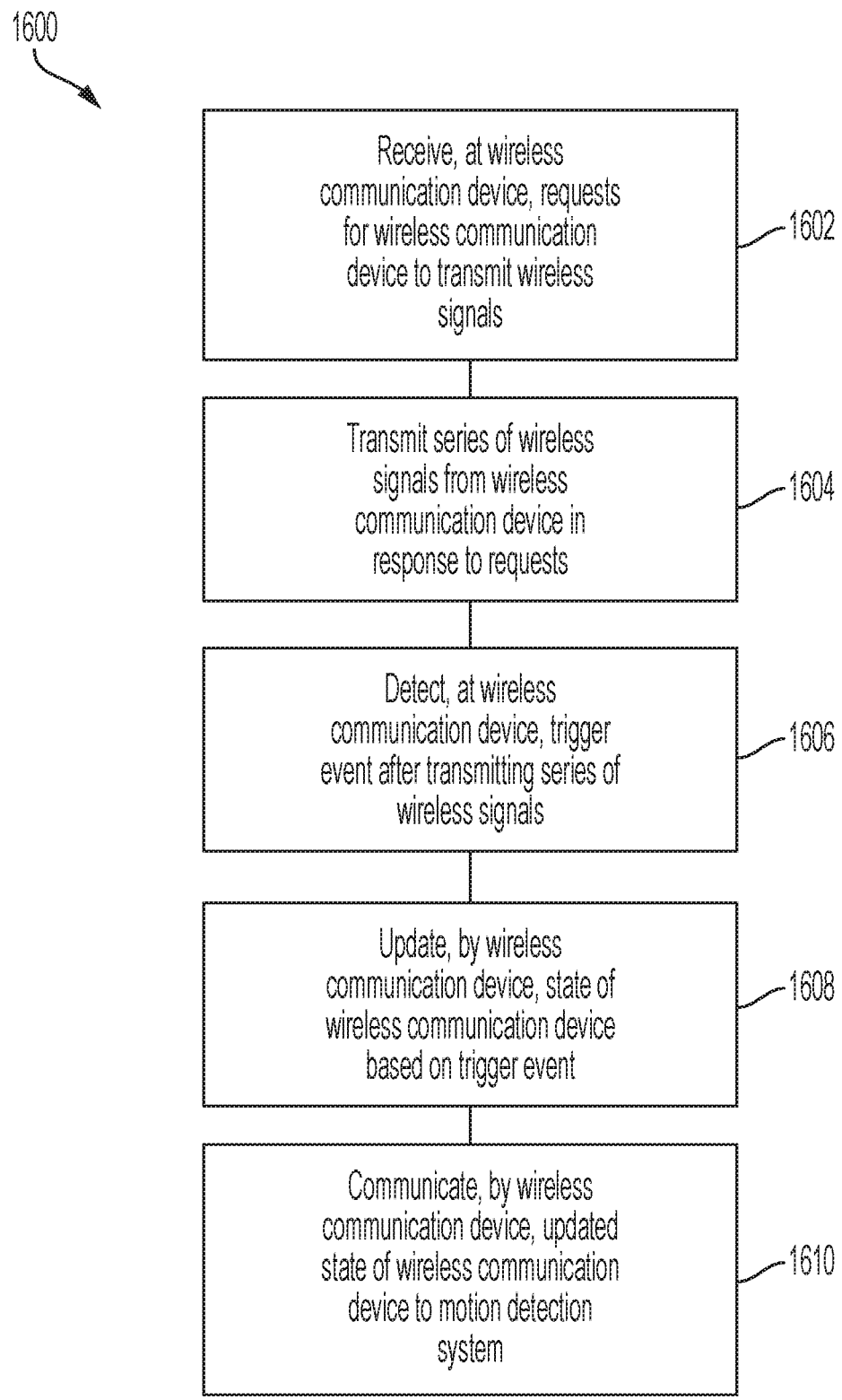
FIG. 16 is a flow diagram showing an example process performed by a wireless communication device in a motion detection system that controls device participation in the motion detection system.

FIG. 16 is a flow diagram showing an example process 1600 performed by a wireless communication device in a motion detection system that controls device participation in the motion detection system. Operation 1602 of process 1600 includes receiving, at a wireless communication device, requests for the wireless communication device to transmit wireless signals. The requests can be initiated by a motion detection system. Operation 1604 of process 1600 includes transmitting a series of wireless signals from the wireless communication device in response to the requests. Operation 1606 of process 1600 includes detecting, at the wireless communication device, a trigger event (e.g. trigger 1004 in FIG. 10A) after transmitting the series of wireless signals. Operation 1608 of process 1600 includes updating, by the wireless communication device, a state of the wireless communication device based on the trigger event. The updated state (e.g. Motion Participation Disabled state 1003 in FIG. 10A) may indicate that the wireless communication device is not enabled to transmit wireless signals in response to the requests from the motion detection system. Operation 1610 of process 1600 communicating, by the wireless communication device, the updated state of the wireless communication device to the motion detection system (e.g., operation 1025 in FIG. 10B).

Figure 17:
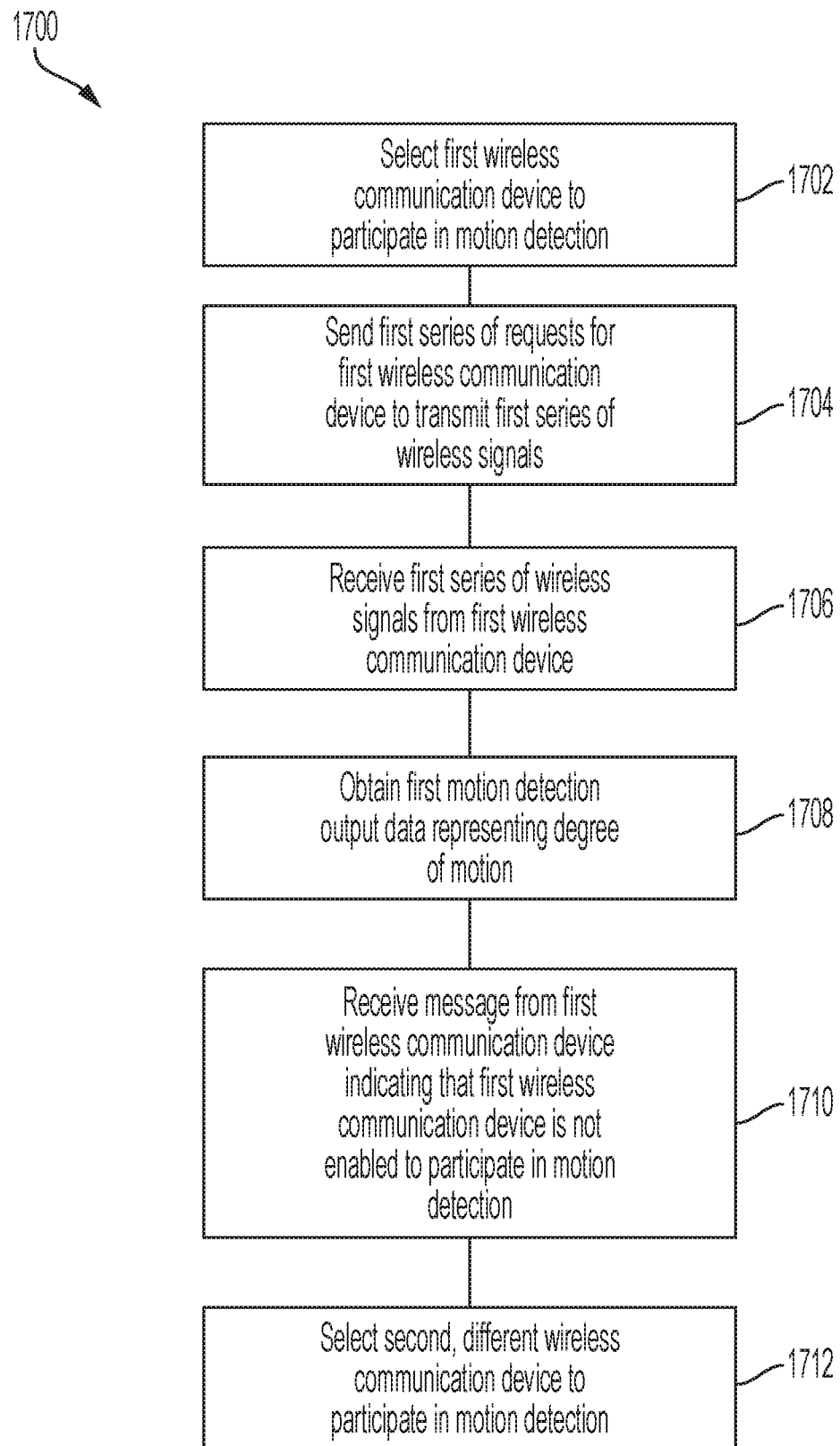
FIG. 17 is a flow diagram showing an example process performed by a motion detection system to control device participation in the motion detection system.

FIG. 17 is a flow diagram showing an example process 1700 performed by a motion detection system to control device participation in the motion detection system. Process 1700 may, as an example, be executed by the motion detection system 1100 shown in FIG. 11. Operation 1702 of process 1700 includes selecting a first wireless communication device to participate in motion detection in a motion detection system. Operation 1704 of process 1700 includes sending a first series of requests to the first wireless communication device to transmit a first series of wireless signals. Operation 1706 of process 1700 includes receiving the first series of wireless signals from the first wireless communication device. Operation 1708 of process 1700 includes obtaining first motion detection output data representing a degree of motion. The degree of motion may be detected by the motion detection system based on the first series of wireless signal. Operation 1710 of process 1700 includes receiving a message from the first wireless communication device indicating that the first wireless communication device is not enabled to participate in motion detection. Operation 1712 of process 1700, which is executed in response to receiving the message, includes selecting a second, different wireless communication device to participate in the motion detection in the motion detection system.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

In a first example, a method includes controlling attributes or operations of a wireless communication network, and detecting motion of objects based on wireless signals exchanged in the wireless communication network. In a second example, a non-transitory computer-readable medium stores instructions that are operable when executed by data processing apparatus to perform one or more operations of the first example. In a third example, a system includes a plurality of wireless communication devices, and a computer device configured to perform one or more operations of the first example. One of the wireless communication devices can be or include the computer device, or the computer device can be located remote from the wireless communication devices.

Example 1A

A method includes: in response to a first series of sampling instructions asserted at a first sampling rate in a motion detection system, sending a first series of requests for a wireless communication device to transmit a first series of wireless signals; receiving the first series of wireless signals transmitted by the wireless communication device in response to the first series of requests; obtaining motion detection output data representing a degree of motion detected by the motion detection system based on the first series of wireless signals; changing a rate at which sampling instructions are asserted from the first sampling rate to a second, different sampling rate based on the motion detection output data, wherein changing the rate includes generating a rate control signal indicative of the second sampling rate; and in response to a second series of sampling instructions asserted at the second sampling rate in the motion detection system, sending a second series of requests for the wireless communication device to transmit a second series of wireless signals.

Example 2A

The method of Example 1A, wherein the first and second series of sampling instructions each include a device identifier indicative of an identity of the wireless communication device.

Example 3A

The method of Example 2A, wherein at least one of the first series of requests, the second series of requests, the motion detection output data, or the rate control signal includes the device identifier.

Example 4A

The method of Example 1A, wherein the first and second series of sampling instructions are asserted in response to an indication that the wireless communication device is available to participate in motion detection.

Example 5A

The method of Example 1A, wherein the rate control signal is generated based on one or more parameters, the one or more parameters including at least one of: a maximum value for the first sampling rate; a maximum value for the second sampling rate; a minimum value for the first sampling rate; a minimum value for the second sampling rate; or at least one time constant indicative of a difference between the first and second sampling rates.

Example 6A

The method of Example 1A, wherein the first and second series of wireless signals are transmitted by the wireless communication device in a wireless network, and wherein the wireless communication device and at least one other wireless communication device are configured to communicate in the wireless network.

Example 7A

The method of Example 6A, wherein the one or more parameters are device-specific parameters applicable to the wireless communication device and not to the at least one other wireless communication device.

Example 8A

The method of Example 6A, wherein the one or more parameters are global parameters applicable to the wireless communication device and to the at least one other wireless communication device.

Example 9A

The method of Example 1A, wherein the motion detection output data is indicative of a decrease in the degree of motion in a space interrogated by the first series of wireless signals, and wherein the second sampling rate is less than the first sampling rate.

Example 10A

The method of Example 1A, wherein the motion detection output data is indicative of an increase in the degree of motion in a space interrogated by the first series of wireless signals, and wherein the second sampling rate is greater than the first sampling rate.

Example 11A

A wireless communication device includes: a processor; and a memory including instructions which, when executed by the processor, cause the wireless communication device to perform operations including: in response to a first series of sampling instructions asserted at a first sampling rate in a motion detection system, sending a first series of requests for the wireless communication device to transmit a first series of wireless signals; receiving the first series of wireless signals transmitted by the wireless communication device in response to the first series of requests; obtaining motion detection output data representing a degree of motion detected by the motion detection system based on the first series of wireless signals; changing a rate at which sampling instructions are asserted from the first sampling rate to a second, different sampling rate based on the motion detection output data, wherein changing the rate includes generating a rate control signal indicative of the second sampling rate; and in response to a second series of sampling instructions asserted at the second sampling rate in the motion detection system, sending a second series of requests for the wireless communication device to transmit a second series of wireless signals.

Example 12A

The device of Example 11A, wherein the first and second series of sampling instructions each include a device identifier indicative of an identity of the wireless communication device.

Example 13A

The device of Example 12A, wherein at least one of the first series of requests, the second series of requests, the motion detection output data, or the rate control signal includes the device identifier.

Example 14A

The device of Example 11A, wherein the first and second series of sampling instructions are asserted in response to an indication that the wireless communication device is available to participate in motion detection.

Example 15A

The device of Example 11A, wherein the rate control signal is generated based on one or more parameters, the one or more parameters including at least one of: a maximum value for the first sampling rate; a maximum value for the second sampling rate; a minimum value for the first sampling rate; a minimum value for the second sampling rate; or at least one time constant indicative of a difference between the first and second sampling rates.

Example 16A

The device of Example 11A, wherein the first and second series of wireless signals are transmitted by the wireless communication device in a wireless network, and wherein the wireless communication device and at least one other wireless communication device are configured to communicate in the wireless network.

Example 17A

The device of Example 16A, wherein the one or more parameters are device-specific parameters applicable to the wireless communication device and not to the at least one other wireless communication device.

Example 18A

The device of Example 16A, wherein the one or more parameters are global parameters applicable to the wireless communication device and to the at least one other wireless communication device.

Example 19A

The device of Example 11A, wherein the motion detection output data is indicative of a decrease in the degree of motion in a space interrogated by the first series of wireless signals, and wherein the second sampling rate is less than the first sampling rate.

Example 20A

The device of Example 11A, wherein the motion detection output data is indicative of an increase in the degree of motion in a space interrogated by the first series of wireless signals, and wherein the second sampling rate is greater than the first sampling rate.

Example 21A

A non-transitory computer-readable medium including instructions that, when executed by data processing apparatus, perform operations including: in response to a first series of sampling instructions asserted at a first sampling rate in a motion detection system, sending a first series of requests for a wireless communication device to transmit a first series of wireless signals; receiving the first series of wireless signals transmitted by the wireless communication device in response to the first series of requests; obtaining motion detection output data representing a degree of motion detected by the motion detection system based on the first series of wireless signals; changing a rate at which sampling instructions are asserted from the first sampling rate to a second, different sampling rate based on the motion detection output data, wherein changing the rate includes generating a rate control signal indicative of the second sampling rate; and in response to a second series of sampling instructions asserted at the second sampling rate in the motion detection system, sending a second series of requests for the wireless communication device to transmit a second series of wireless signals.

Example 22A

The computer-readable medium of Example 21A, wherein the first and second series of sampling instructions each include a device identifier indicative of an identity of the wireless communication device.

Example 23A

The computer-readable medium of Example 22A, wherein at least one of the first series of requests, the second series of requests, the motion detection output data, or the rate control signal includes the device identifier.

Example 24A

The computer-readable medium of Example 21A, wherein the first and second series of sampling instructions are asserted in response to an indication that the wireless communication device is available to participate in motion detection.

Example 25A

The computer-readable medium of Example 21A, wherein the rate control signal is generated based on one or more parameters, the one or more parameters including at least one of: a maximum value for the first sampling rate; a maximum value for the second sampling rate; a minimum value for the first sampling rate; a minimum value for the second sampling rate; or at least one time constant indicative of a difference between the first and second sampling rates.

Example 26A

The computer-readable medium of Example 21A, wherein the first and second series of wireless signals are transmitted by the wireless communication device in a wireless network, and wherein the wireless communication device and at least one other wireless communication device are configured to communicate in the wireless network.

Example 27A

The computer-readable medium of Example 26A, wherein the one or more parameters are device-specific parameters applicable to the wireless communication device and not to the at least one other wireless communication device.

Example 28A

The computer-readable medium of Example 26A, wherein the one or more parameters are global parameters applicable to the wireless communication device and to the at least one other wireless communication device.

Example 29A

The computer-readable medium of Example 21A, wherein the motion detection output data is indicative of a decrease in the degree of motion in a space interrogated by the first series of wireless signals, and wherein the second sampling rate is less than the first sampling rate.

Example 30A

The computer-readable medium of Example 21A, wherein the motion detection output data is indicative of an increase in the degree of motion in a space interrogated by the first series of wireless signals, and wherein the second sampling rate is greater than the first sampling rate.

Example 1B

A method includes: receiving first motion detection output data representing a degree of motion detected by a motion detection system based on wireless signals exchanged in a wireless communication network, the wireless communication network including a first access point device and a first client device communicatively coupled by a first wireless communication link; receiving network information indicative of a network topology of the wireless communication network; generating a first control signal configured to change a characteristic of the first wireless communication link based on the first motion detection output data and the network information; and receiving second motion detection output data representing a degree of motion detected by the motion detection system based on wireless signals exchanged in the wireless communication network after the characteristic of the first wireless communication link has changed in response to the first control signal.

Example 2B

The method of Example 1B, wherein the first control signal is configured to change a frequency band of the first wireless communication link from a first frequency band to a second frequency band.

Example 3B

The method of Example 2B, wherein the first control signal is generated in response to the motion detection system detecting, based on the first motion detection output data, that motion is present at the first client device.

Example 4B

The method of Example 1B, wherein the first control signal is configured to disable the first wireless communication link and enable a second wireless communication link between a second access point device and the first client device.

Example 5B

The method of Example 4B, wherein the first control signal is generated in response to the motion detection system detecting, based on the first motion detection output data, that motion is present at the second access point device.

Example 6B

The method of Example 1B, wherein the first and second motion detection output data include one or more motion scores generated based on channel information computed from wireless signals communicated in the wireless communication network.

Example 7B

The method of Example 1B, wherein the wireless communication network includes: a plurality of access points devices including the first access point device; and a plurality of client devices communicatively coupled to each of the plurality of access points by respective wireless communication links, wherein the network information includes information indicative of at least one of: identities of the plurality of access points devices; identities of the plurality of client devices; or frequency bands of the respective wireless communication links.

Example 8B

The method of Example 1B, further including generating a second control signal configured to change a designation of the first client device based on the first motion detection output data and the network information.

Example 9B

The method of Example 8B, wherein the first motion detection output data indicates that motion is present at the first access point device, and wherein the second control signal is configured to designate the first client device as being enabled to participate in motion detection.

Example 10B

The method of Example 8B, wherein the first motion detection output data indicates that motion is absent at the first access point device, and wherein the second control signal is configured to designate the first client device as being disabled from participating in motion detection.

Example 11B

A wireless communication device includes: a processor; and a memory including instructions which, when executed by the processor, cause the wireless communication device to perform operations including: receiving first motion detection output data representing a degree of motion detected by a motion detection system based on wireless signals exchanged in a wireless communication network, the wireless communication network including a first access point device and a first client device communicatively coupled by a first wireless communication link; receiving network information indicative of a network topology of the wireless communication network; generating a first control signal configured to change a characteristic of the first wireless communication link based on the first motion detection output data and the network information; and receiving second motion detection output data representing a degree of motion detected by the motion detection system based on wireless signals exchanged in the wireless communication network after the characteristic of the first wireless communication link has changed in response to the first control signal.

Example 12B

The device of Example 11B, wherein the first control signal is configured to change a frequency band of the first wireless communication link from a first frequency band to a second frequency band.

Example 13B

The device of Example 12B, wherein the first control signal is generated in response to the motion detection system detecting, based on the first motion detection output data, that motion is present at the first client device.

Example 14B

The device of Example 11B, wherein the first control signal is configured to disable the first wireless communication link and enable a second wireless communication link between a second access point device and the first client device.

Example 15B

The device of Example 14B, wherein the first control signal is generated in response to the motion detection system detecting, based on the first motion detection output data, that motion is present at the second access point device.

Example 16B

The device of Example 11B, wherein the first and second motion detection output data include one or more motion scores generated based on channel information computed from wireless signals communicated in the wireless communication network.

Example 17B

The device of Example 11B, wherein the wireless communication network includes: a plurality of access points devices including the first access point device; and a plurality of client devices communicatively coupled to each of the plurality of access points by respective wireless communication links, wherein the network information includes information indicative of at least one of: identities of the plurality of access points devices; identities of the plurality of client devices; or frequency bands of the respective wireless communication links.

Example 18B

The device of Example 11B, the operations further including generating a second control signal configured to change a designation of the first client device based on the first motion detection output data and the network information.

Example 19B

The device of Example 18B, wherein the first motion detection output data indicates that motion is present at the first access point device, and wherein the second control signal is configured to designate the first client device as being enabled to participate in motion detection.

Example 20B

The device of Example 18B, wherein the first motion detection output data indicates that motion is absent at the first access point device, and wherein the second control signal is configured to designate the first client device as being disabled from participating in motion detection.

Example 21B

A non-transitory computer-readable medium including instructions that, when executed by data processing apparatus, perform operations including: receiving first motion detection output data representing a degree of motion detected by a motion detection system based on wireless signals exchanged in a wireless communication network, the wireless communication network including a first access point device and a first client device communicatively coupled by a first wireless communication link; receiving network information indicative of a network topology of the wireless communication network; generating a first control signal configured to change a characteristic of the first wireless communication link based on the first motion detection output data and the network information; and receiving second motion detection output data representing a degree of motion detected by the motion detection system based on wireless signals exchanged in the wireless communication network after the characteristic of the first wireless communication link has changed in response to the first control signal.

Example 22B

The computer-readable medium of Example 21B, wherein the first control signal is configured to change a frequency band of the first wireless communication link from a first frequency band to a second frequency band.

Example 23B

The computer-readable medium of Example 22B, wherein the first control signal is generated in response to the motion detection system detecting, based on the first motion detection output data, that motion is present at the first client device.

Example 24B

The computer-readable medium of Example 21B, wherein the first control signal is configured to disable the first wireless communication link and enable a second wireless communication link between a second access point device and the first client device.

Example 25B

The computer-readable medium of Example 24B, wherein the first control signal is generated in response to the motion detection system detecting, based on the first motion detection output data, that motion is present at the second access point device.

Example 26B

The computer-readable medium of Example 21B, wherein the first and second motion detection output data include one or more motion scores generated based on channel information computed from wireless signals communicated in the wireless communication network.

Example 27B

The computer-readable medium of Example 21B, wherein the wireless communication network includes: a plurality of access points devices including the first access point device; and a plurality of client devices communicatively coupled to each of the plurality of access points by respective wireless communication links, wherein the network information includes information indicative of at least one of: identities of the plurality of access points devices; identities of the plurality of client devices; or frequency bands of the respective wireless communication links.

Example 28B

The computer-readable medium of Example 21B, further including generating a second control signal configured to change a designation of the first client device based on the first motion detection output data and the network information.

Example 29B

The computer-readable medium of Example 28B, wherein the first motion detection output data indicates that motion is present at the first access point device, and wherein the second control signal is configured to designate the first client device as being enabled to participate in motion detection.

Example 30B

The computer-readable medium of Example 28B, wherein the first motion detection output data indicates that motion is absent at the first access point device, and wherein the second control signal is configured to designate the first client device as being disabled from participating in motion detection.

Example 1C

A method includes: receiving, at a wireless communication device, requests for the wireless communication device to transmit wireless signals, the requests initiated by a motion detection system; transmitting a series of wireless signals from the wireless communication device in response to the requests; detecting, at the wireless communication device, a trigger event after transmitting the series of wireless signals; updating, by the wireless communication device, a state of the wireless communication device based on the trigger event, the updated state indicating that the wireless communication device is not enabled to transmit wireless signals in response to the requests from the motion detection system; and communicating, by the wireless communication device, the updated state of the wireless communication device to the motion detection system.

Example 2C

The method of Example 1C, wherein the wireless communication device is configured to communicate in a wireless communication network, and wherein the requests, the series of wireless signals, and the updated state of the wireless communication device are communicated wirelessly according to protocols defined by the wireless communication network.

Example 3C

The method of Example 2C, wherein the motion detection system uses the wireless communication network to detect motion, wherein the wireless communication device is a client node in the wireless communication network, and wherein the updated state of the wireless communication device is communicated to an access point of the wireless communication network.

Example 4C

The method of Example 1C, further including: receiving, at the wireless communication device, further requests for the wireless communication device to transmit wireless signals, the further requests initiated by the motion detection system after the trigger event; and communicating, by the wireless communication device, an indication that the wireless communication device cannot comply with the request.

Example 5C

The method of Example 1C, further including: by operation of the motion detection system and in response to the updated state of the wireless communication device, selecting one or more other wireless communication devices enabled to transmit wireless signals in response to further requests from the motion detection system.

Example 6C

The method of Example 5C, further including: detecting, at the wireless communication device, a second trigger event; updating, by the wireless communication device, the updated state of the wireless communication device based on the second trigger event, the second updated state indicating that the wireless communication device is enabled to transmit wireless signals in response to the requests from the motion detection system; and communicating, by the wireless communication device, the second updated state of the wireless communication device to the motion detection system.

Example 7C

The method of Example 6C, further including: selecting, by the motion detection system, the wireless communication device to participate in motion detection in response to receiving the updated state.

Example 8C

The method of Example 6C, further including: after the second trigger event, receiving, at the wireless communication device, further requests for the wireless communication device to transmit wireless signals, the further requests initiated by the motion detection system; and transmitting a second series of wireless signals from the wireless communication device in response to the further requests.

Example 9C

The method of Example 1C, wherein the motion detection system is configured to use the series of wireless signals to detect motion of an object in a space accessed by the series of wireless signals.

Example 10C

The method of Example 1C, wherein the trigger event includes a disconnection of the wireless communication device from a battery charger.

Example 11C

A wireless communication device includes: a processor; and a memory including instructions which, when executed by the processor, cause the wireless communication device to perform operations including: receiving requests for the wireless communication device to transmit wireless signals, the requests initiated by a motion detection system; transmitting a series of wireless signals from the wireless communication device in response to the requests; detecting a trigger event after transmitting the series of wireless signals; updating a state of the wireless communication device based on the trigger event, the updated state indicating that the wireless communication device is not enabled to transmit wireless signals in response to the requests from the motion detection system; and communicating, by the wireless communication device, the updated state of the wireless communication device to the motion detection system.

Example 12C

The device of Example 11C, wherein the wireless communication device is configured to communicate in a wireless communication network, and wherein the requests, the series of wireless signals, and the updated state of the wireless communication device are communicated wirelessly according to protocols defined by the wireless communication network.

Example 13C

The device of Example 12C, wherein the motion detection system uses the wireless communication network to detect motion, wherein the wireless communication device is a client node in the wireless communication network, and wherein the updated state of the wireless communication device is communicated to an access point of the wireless communication network.

Example 14C

The device of Example 11C, the operations further including: receiving further requests for the wireless communication device to transmit wireless signals, the further requests initiated by the motion detection system after the trigger event; and communicating an indication that the wireless communication device cannot comply with the request.

Example 15C

The device of Example 11C, the operations further including: detecting a second trigger event; updating the updated state of the wireless communication device based on the second trigger event, the second updated state indicating that the wireless communication device is enabled to transmit wireless signals in response to the requests from the motion detection system; and communicating the updated state of the wireless communication device to the motion detection system.

Example 16C

The device of Example 15C, the operations further including: after the second trigger event, receiving further requests for the wireless communication device to transmit wireless signals, the further requests initiated by the motion detection system; and transmitting a second series of wireless signals from the wireless communication device in response to the further requests.

Example 17C

The device of Example 11C, wherein the trigger event includes a disconnection of the wireless communication device from a battery charger.

Example 18C

A non-transitory computer-readable medium including instructions that, when executed by data processing apparatus, perform operations including: receiving, at a wireless communication device, requests for the wireless communication device to transmit wireless signals, the requests initiated by a motion detection system; transmitting a series of wireless signals from the wireless communication device in response to the requests; detecting, at the wireless communication device, a trigger event after transmitting the series of wireless signals; updating, by the wireless communication device, a state of the wireless communication device based on the trigger event, the updated state indicating that the wireless communication device is not enabled to transmit wireless signals in response to the requests from the motion detection system; and communicating, by the wireless communication device, the updated state of the wireless communication device to the motion detection system.

Example 19C

The computer-readable medium of Example 18C, wherein the wireless communication device is configured to communicate in a wireless communication network, and wherein the requests, the series of wireless signals, and the updated state of the wireless communication device are communicated wirelessly according to protocols defined by the wireless communication network.

Example 20C

The computer-readable medium of Example 19C, wherein the motion detection system uses the wireless communication network to detect motion, wherein the wireless communication device is a client node in the wireless communication network, and wherein the updated state of the wireless communication device is communicated to an access point of the wireless communication network.

Example 21C

The computer-readable medium of Example 18C, the operations further including: receiving, at the wireless communication device, further requests for the wireless communication device to transmit wireless signals, the further requests initiated by the motion detection system after the trigger event; and communicating, by the wireless communication device, an indication that the wireless communication device cannot comply with the request.

Example 22C

The computer-readable medium of Example 18C, the operations further including: by operation of the motion detection system and in response to the updated state of the wireless communication device, selecting one or more other wireless communication devices enabled to transmit wireless signals in response to further requests from the motion detection system.

Example 23C

The computer-readable medium of Example 22C, the operations further including: detecting, at the wireless communication device, a second trigger event; updating, by the wireless communication device, the updated state of the wireless communication device based on the second trigger event, the second updated state indicating that the wireless communication device is enabled to transmit wireless signals in response to the requests from the motion detection system; and communicating, by the wireless communication device, the second updated state of the wireless communication device to the motion detection system.

Example 24C

The computer-readable medium of Example 23C, the operations further including: selecting, by the motion detection system, the wireless communication device to participate in motion detection in response to receiving the updated state.

Example 25C

The computer-readable medium of Example 23C, the operations further including: after the second trigger event, receiving, at the wireless communication device, further requests for the wireless communication device to transmit wireless signals, the further requests initiated by the motion detection system; and transmitting a second series of wireless signals from the wireless communication device in response to the further requests.

Example 26C

The computer-readable medium of Example 18C, wherein the motion detection system is configured to use the series of wireless signals to detect motion of an object in a space accessed by the series of wireless signals.

Example 27C

The computer-readable medium of Example 18C, wherein the trigger event includes a disconnection of the wireless communication device from a battery charger.

Example 28C

A method includes: selecting a first wireless communication device to participate in motion detection in a motion detection system; sending a first series of requests to the first wireless communication device to transmit a first series of wireless signals; receiving the first series of wireless signals from the first wireless communication device; obtaining first motion detection output data representing a degree of motion detected by the motion detection system based on the first series of wireless signals; receiving a message from the first wireless communication device indicating that the first wireless communication device is not enabled to participate in motion detection; and in response to receiving the message, selecting a second, different wireless communication device to participate in the motion detection in the motion detection system.

Example 29C

The method of Example 28C, further including: sending a second series of requests to the second wireless communication device to transmit a second series of wireless signals; receiving the second series of wireless signals from the second wireless communication device; and obtaining second motion detection output data representing the degree of motion detected by the motion detection system based on the second series of wireless signals.

Example 30C

The method of Example 28C, wherein the message from the first wireless communication device is received in response to the first wireless communication device being disconnected from a battery charger.

Example 31C

The method of Example 28C, wherein the first wireless communication device is configured to communicate in a wireless communication network, and wherein the first series of requests, the first series of wireless signals, and the message are communicated wirelessly according to protocols defined by the wireless communication network.

Example 32C

The method of Example 28C, further including: after receiving the message from the first wireless communication device, sending a further series of requests to the first wireless communication device to transmit a further series of wireless signals; and receiving a further message from the first wireless communication device indicating that the first wireless communication device cannot comply with the further series of requests.

Example 33C

The method of Example 28C, further including: after receiving the message from the first wireless communication device, receiving a second further message from the first wireless communication device indicating that the first wireless communication device is enabled to participate in motion detection.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the present disclosure.

What is claimed is:

1. A method, comprising:
    receiving first motion detection output data representing a degree of motion detected by a wireless sensing system based on wireless signals exchanged in a wireless communication network, the wireless communication network comprising a first access point device and a first client device communicatively coupled by a first wireless communication link;
    receiving network information indicative of a network topology of the wireless communication network;
    generating a first control signal configured to change a characteristic of the first wireless communication link based on the first motion detection output data and the network information; and
    receiving second motion detection output data representing a degree of motion detected by the wireless sensing system based on wireless signals exchanged in the wireless communication network after the characteristic of the first wireless communication link has changed in response to the first control signal.

2. The method of claim 1, wherein the first control signal is configured to change a frequency band of the first wireless communication link from a first frequency band to a second frequency band.

3. The method of claim 2, wherein the first control signal is generated in response to the wireless sensing system detecting, based on the first motion detection output data, that motion is present at the first client device.

4. The method of claim 1, wherein the first control signal is configured to disable the first wireless communication link and enable a second wireless communication link between a second access point device and the first client device.

5. The method of claim 4, wherein the first control signal is generated in response to the wireless sensing system detecting, based on the first motion detection output data, that motion is present at the second access point device.

6. The method of claim 1, wherein the first and second motion detection output data comprise one or more motion scores generated based on channel information computed from wireless signals communicated in the wireless communication network.

7. The method of claim 1, wherein the wireless communication network comprises:
 a plurality of access points devices comprising the first access point device; and
 a plurality of client devices communicatively coupled to each of the plurality of access points by respective wireless communication links, wherein the network information comprises information indicative of at least one of:
  identities of the plurality of access points devices;
  identities of the plurality of client devices; or
  frequency bands of the respective wireless communication links.

8. The method of claim 1, further comprising generating a second control signal configured to change a designation of the first client device based on the first motion detection output data and the network information.

9. The method of claim 8, wherein the first motion detection output data indicates that motion is present at the first access point device, and wherein the second control signal is configured to designate the first client device as being enabled to participate in motion detection.

10. The method of claim 8, wherein the first motion detection output data indicates that motion is absent at the first access point device, and wherein the second control signal is configured to designate the first client device as being disabled from participating in motion detection.

11. A wireless communication device comprising:
 a processor; and
 a memory comprising instructions which, when executed by the processor, cause the wireless communication device to perform operations comprising:
  receiving first motion detection output data representing a degree of motion detected by a wireless sensing system based on wireless signals exchanged in a wireless communication network, the wireless communication network comprising a first access point device and a first client device communicatively coupled by a first wireless communication link;
  receiving network information indicative of a network topology of the wireless communication network;
  generating a first control signal configured to change a characteristic of the first wireless communication link based on the first motion detection output data and the network information; and
  receiving second motion detection output data representing a degree of motion detected by the wireless sensing system based on wireless signals exchanged in the wireless communication network after the characteristic of the first wireless communication link has changed in response to the first control signal.

12. The device of claim 11, wherein the first control signal is configured to change a frequency band of the first wireless communication link from a first frequency band to a second frequency band.

13. The device of claim 12, wherein the first control signal is generated in response to the wireless sensing system detecting, based on the first motion detection output data, that motion is present at the first client device.

14. The device of claim 11, wherein the first control signal is configured to disable the first wireless communication link and enable a second wireless communication link between a second access point device and the first client device.

15. The device of claim 14, wherein the first control signal is generated in response to the wireless sensing system detecting, based on the first motion detection output data, that motion is present at the second access point device.

16. The device of claim 11, wherein the first and second motion detection output data comprise one or more motion scores generated based on channel information computed from wireless signals communicated in the wireless communication network.

17. The device of claim 11, wherein the wireless communication network comprises:
 a plurality of access points devices comprising the first access point device; and
 a plurality of client devices communicatively coupled to each of the plurality of access points by respective wireless communication links, wherein the network information comprises information indicative of at least one of:
  identities of the plurality of access points devices;
  identities of the plurality of client devices; or
  frequency bands of the respective wireless communication links.

18. The device of claim 11, the operations further comprising generating a second control signal configured to change a designation of the first client device based on the first motion detection output data and the network information.

19. The device of claim 18, wherein the first motion detection output data indicates that motion is present at the first access point device, and wherein the second control signal is configured to designate the first client device as being enabled to participate in motion detection.

20. The device of claim 18, wherein the first motion detection output data indicates that motion is absent at the first access point device, and wherein the second control signal is configured to designate the first client device as being disabled from participating in motion detection.

21. A non-transitory computer-readable medium comprising instructions that, when executed by data processing apparatus, perform operations comprising:
 receiving first motion detection output data representing a degree of motion detected by a wireless sensing system based on wireless signals exchanged in a wireless communication network, the wireless communication network comprising a first access point device and a first client device communicatively coupled by a first wireless communication link;
 receiving network information indicative of a network topology of the wireless communication network;

generating a first control signal configured to change a characteristic of the first wireless communication link based on the first motion detection output data and the network information; and receiving second motion detection output data representing a degree of motion detected by the wireless sensing system based on wireless signals exchanged in the wireless communication network after the characteristic of the first wireless communication link has changed in response to the first control signal.

22. The computer-readable medium of claim 21, wherein the first control signal is configured to change a frequency band of the first wireless communication link from a first frequency band to a second frequency band.

23. The computer-readable medium of claim 22, wherein the first control signal is generated in response to the wireless sensing system detecting, based on the first motion detection output data, that motion is present at the first client device.

24. The computer-readable medium of claim 21, wherein the first control signal is configured to disable the first wireless communication link and enable a second wireless communication link between a second access point device and the first client device.

25. The computer-readable medium of claim 24, wherein the first control signal is generated in response to the wireless sensing system detecting, based on the first motion detection output data, that motion is present at the second access point device.

26. The computer-readable medium of claim 21, wherein the first and second motion detection output data comprise one or more motion scores generated based on channel information computed from wireless signals communicated in the wireless communication network.

27. The computer-readable medium of claim 21, wherein the wireless communication network comprises:
  a plurality of access points devices comprising the first access point device; and
  a plurality of client devices communicatively coupled to each of the plurality of access points by respective wireless communication links, wherein the network information comprises information indicative of at least one of:
    identities of the plurality of access points devices;
    identities of the plurality of client devices; or
    frequency bands of the respective wireless communication links.

28. The computer-readable medium of claim 21, further comprising generating a second control signal configured to change a designation of the first client device based on the first motion detection output data and the network information.

29. The computer-readable medium of claim 28, wherein the first motion detection output data indicates that motion is present at the first access point device, and wherein the second control signal is configured to designate the first client device as being enabled to participate in motion detection.

30. The computer-readable medium of claim 28, wherein the first motion detection output data indicates that motion is absent at the first access point device, and wherein the second control signal is configured to designate the first client device as being disabled from participating in motion detection.

* * * * *